United States Patent
Sigmon, Jr. et al.

(10) Patent No.: US 9,077,860 B2
(45) Date of Patent: *Jul. 7, 2015

(54) SYSTEM AND METHOD FOR PROVIDING VIDEO CONTENT ASSOCIATED WITH A SOURCE IMAGE TO A TELEVISION IN A COMMUNICATION NETWORK

(75) Inventors: Robert B. Sigmon, Jr., San Jose, CA (US); Lena Y. Pavlovskaia, Cupertino, CA (US); Airan S. Landau, San Jose, CA (US)

(73) Assignee: ActiveVideo Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/311,203

(22) Filed: Dec. 5, 2011

(65) Prior Publication Data

US 2012/0137337 A1    May 31, 2012

Related U.S. Application Data

(63) Continuation of application No. 11/258,601, filed on Oct. 25, 2005, now Pat. No. 8,074,248.

(60) Provisional application No. 60/702,507, filed on Jul. 26, 2005.

(51) Int. Cl.
  *H04N 7/173*    (2011.01)
  *H04N 5/14*    (2006.01)
  (Continued)

(52) U.S. Cl.
  CPC ...... *H04N 7/17336* (2013.01); *G06F 17/30905* (2013.01); *H04N 7/17318* (2013.01); *H04N 21/443* (2013.01)

(58) Field of Classification Search
  CPC .............. H04N 21/23; H04N 21/2343; H04N 21/234309; H04N 21/234327; H04N 21/234345; H04N 21/2355; H04N 21/238; H04N 21/2393; H04N 21/437; H04N 21/438; H04N 21/47202; H04N 21/60; H04N 21/631; H04N 21/64761; H04N 21/64769; H04N 21/4769; H04N 7/17336; H04N 7/17318
  USPC ............. 725/110, 112–113, 136; 348/240.11, 348/240.25, 240.26, 571, 584, 608
  See application file for complete search history.

(56) References Cited

U.S. PATENT DOCUMENTS 3,889,050 A    6/1975    Thompson
3,934,079 A    1/1976    Barnhart ........................ 178/5.1
(Continued)

FOREIGN PATENT DOCUMENTS

AT    191599 T    4/2000
AT    198969 T    2/2001
(Continued)

OTHER PUBLICATIONS

Star, "Video on Demand Without Compression: a Review of the Business Model, Regulation and Future Implication".
(Continued)

*Primary Examiner* — Hai V Tran
(74) *Attorney, Agent, or Firm* — Morgan, Lewis & Bockius LLP

(57) ABSTRACT

A system and method are provided for processing video content, associated with a source image, for display on a television. The source image, such as a web page, and its associated (e.g., linked) video content are retrieved and separately encoded. The encoded source image and the encoded video content are composited together to form a sequence of encoded video frames, where a frame type of the video content is used to determine a type of a composited frame. For example, if all displayed frames of the video content are MPEG I-frames, then the composited frame also may be an I-frame. However, if any displayed frame of video content is an MPEG P-frame or B-frame, then the composited frame may be a P-frame.

25 Claims, 6 Drawing Sheets

(51) Int. Cl.
  *H04N 9/64* (2006.01)
  *H04N 9/74* (2006.01)
  *H04N 5/00* (2011.01)
  *G06F 17/30* (2006.01)
  *H04N 21/443* (2011.01)

(56) References Cited

U.S. PATENT DOCUMENTS

| | | | | |
|---|---|---|---|---|
| 3,997,718 | A | 12/1976 | Ricketts et al. | 178/6.8 |
| 4,002,843 | A | 1/1977 | Rackman | |
| 4,032,972 | A | 6/1977 | Saylor | |
| 4,077,006 | A | 2/1978 | Nicholson | 325/308 |
| 4,081,831 | A | 3/1978 | Tang et al. | |
| 4,107,734 | A | 8/1978 | Percy et al. | |
| 4,107,735 | A | 8/1978 | Frohbach | |
| 4,145,720 | A | 3/1979 | Weintraub et al. | |
| 4,168,400 | A | 9/1979 | de Couasnon et al. | |
| 4,186,438 | A | 1/1980 | Benson et al. | |
| 4,222,068 | A | 9/1980 | Thompson | |
| 4,245,245 | A | 1/1981 | Matsumoto et al. | |
| 4,247,106 | A | 1/1981 | Jeffers et al. | |
| 4,253,114 | A | 2/1981 | Tang et al. | |
| 4,264,924 | A | 4/1981 | Freeman | |
| 4,264,925 | A | 4/1981 | Freeman et al. | |
| 4,290,142 | A | 9/1981 | Schnee et al. | |
| 4,302,771 | A | 11/1981 | Gargini | |
| 4,308,554 | A | 12/1981 | Percy et al. | |
| 4,350,980 | A | 9/1982 | Ward | |
| 4,367,557 | A | 1/1983 | Stern et al. | |
| 4,395,780 | A | 7/1983 | Gohm et al. | |
| 4,408,225 | A | 10/1983 | Ensinger et al. | |
| 4,450,477 | A | 5/1984 | Lovett | |
| 4,454,538 | A | 6/1984 | Toriumi | |
| 4,466,017 | A | 8/1984 | Banker | |
| 4,471,380 | A | 9/1984 | Mobley | |
| 4,475,123 | A | 10/1984 | Dumbauld et al. | |
| 4,484,217 | A | 11/1984 | Block et al. | |
| 4,491,983 | A | 1/1985 | Pinnow et al. | 455/612 |
| 4,506,387 | A | 3/1985 | Walter | 455/612 |
| 4,507,680 | A | 3/1985 | Freeman | |
| 4,509,073 | A | 4/1985 | Baran et al. | |
| 4,523,228 | A | 6/1985 | Banker | |
| 4,533,948 | A | 8/1985 | McNamara et al. | |
| 4,536,791 | A | 8/1985 | Campbell et al. | |
| 4,538,174 | A | 8/1985 | Gargini et al. | |
| 4,538,176 | A | 8/1985 | Nakajima et al. | 358/86 |
| 4,553,161 | A | 11/1985 | Citta | |
| 4,554,581 | A | 11/1985 | Tentler et al. | 358/120 |
| 4,555,561 | A | 11/1985 | Sugimori et al. | |
| 4,562,465 | A | 12/1985 | Glaab | |
| 4,567,517 | A | 1/1986 | Mobley | |
| 4,573,072 | A | 2/1986 | Freeman | |
| 4,591,906 | A | 5/1986 | Morales-Garza et al. | |
| 4,602,279 | A | 7/1986 | Freeman | |
| 4,614,970 | A | 9/1986 | Clupper et al. | |
| 4,616,263 | A | 10/1986 | Eichelberger | 358/185 |
| 4,625,235 | A | 11/1986 | Watson | |
| 4,627,105 | A | 12/1986 | Ohashi et al. | |
| 4,633,462 | A | 12/1986 | Stifle et al. | |
| 4,670,904 | A | 6/1987 | Rumreich | |
| 4,682,360 | A | 7/1987 | Frederiksen | |
| 4,695,880 | A | 9/1987 | Johnson et al. | |
| 4,706,121 | A | 11/1987 | Young | |
| 4,706,285 | A | 11/1987 | Rumreich | |
| 4,709,418 | A | 11/1987 | Fox et al. | 455/612 |
| 4,710,971 | A | 12/1987 | Nozaki et al. | |
| 4,718,086 | A | 1/1988 | Rumreich et al. | |
| 4,732,764 | A | 3/1988 | Hemingway et al. | |
| 4,734,764 | A | 3/1988 | Pocock et al. | 358/86 |
| 4,748,689 | A | 5/1988 | Mohr | |
| 4,749,992 | A | 6/1988 | Fitzemeyer et al. | |
| 4,750,036 | A | 6/1988 | Martinez | |
| 4,754,426 | A | 6/1988 | Rast et al. | |
| 4,760,442 | A | 7/1988 | O'Connell et al. | |
| 4,763,317 | A | 8/1988 | Lehman et al. | 370/58 |
| 4,769,833 | A | 9/1988 | Farleigh et al. | |
| 4,769,838 | A | 9/1988 | Hasegawa | |
| 4,789,863 | A | 12/1988 | Bush | |
| 4,792,849 | A | 12/1988 | McCalley et al. | 358/86 |
| 4,801,190 | A | 1/1989 | Imoto | |
| 4,805,134 | A | 2/1989 | Calo et al. | |
| 4,807,031 | A | 2/1989 | Broughton et al. | |
| 4,816,905 | A | 3/1989 | Tweety et al. | 358/86 |
| 4,821,102 | A | 4/1989 | Ichikawa et al. | |
| 4,823,386 | A | 4/1989 | Dumbauld et al. | |
| 4,827,253 | A | 5/1989 | Maltz | |
| 4,827,511 | A | 5/1989 | Masuko | |
| 4,829,372 | A | 5/1989 | McCalley et al. | 358/86 |
| 4,829,558 | A | 5/1989 | Welsh | 372/92 |
| 4,847,698 | A | 7/1989 | Freeman | 358/343 |
| 4,847,699 | A | 7/1989 | Freeman | 358/343 |
| 4,847,700 | A | 7/1989 | Freeman | |
| 4,848,698 | A | 7/1989 | Newell et al. | |
| 4,860,379 | A | 8/1989 | Schoeneberger et al. | |
| 4,864,613 | A | 9/1989 | Van Cleave | |
| 4,876,592 | A | 10/1989 | Von Kohorn | |
| 4,889,369 | A | 12/1989 | Albrecht | |
| 4,890,320 | A | 12/1989 | Monslow et al. | |
| 4,891,694 | A | 1/1990 | Way | |
| 4,901,367 | A | 2/1990 | Nicholson | |
| 4,903,126 | A | 2/1990 | Kassatly | |
| 4,905,094 | A | 2/1990 | Pocock et al. | |
| 4,912,760 | A | 3/1990 | West, Jr. et al. | |
| 4,918,516 | A | 4/1990 | Freeman | 358/86 |
| 4,920,566 | A | 4/1990 | Robbins et al. | |
| 4,922,532 | A | 5/1990 | Farmer et al. | |
| 4,924,303 | A | 5/1990 | Brandon et al. | |
| 4,924,498 | A | 5/1990 | Farmer et al. | |
| 4,937,821 | A | 6/1990 | Boulton | |
| 4,941,040 | A | 7/1990 | Pocock et al. | 358/86 |
| 4,947,244 | A | 8/1990 | Fenwick et al. | 358/86 |
| 4,961,211 | A | 10/1990 | Tsugane et al. | |
| 4,963,995 | A | 10/1990 | Lang | |
| 4,975,771 | A | 12/1990 | Kassatly | |
| 4,989,245 | A | 1/1991 | Bennett | |
| 4,994,909 | A | 2/1991 | Graves et al. | |
| 4,995,078 | A | 2/1991 | Monslow et al. | |
| 5,003,384 | A | 3/1991 | Durden et al. | |
| 5,008,934 | A | 4/1991 | Endoh | |
| 5,014,125 | A | 5/1991 | Pocock et al. | 358/86 |
| 5,027,400 | A | 6/1991 | Baji et al. | |
| 5,051,720 | A | 9/1991 | Kittirutsunetorn | |
| 5,051,822 | A | 9/1991 | Rhoades | |
| 5,057,917 | A | 10/1991 | Shalkauser et al. | |
| 5,058,160 | A | 10/1991 | Banker et al. | |
| 5,060,262 | A | 10/1991 | Bevins, Jr et al. | |
| 5,077,607 | A | 12/1991 | Johnson et al. | |
| 5,083,800 | A | 1/1992 | Lockton | |
| 5,088,111 | A | 2/1992 | McNamara et al. | |
| 5,093,718 | A | 3/1992 | Hoarty et al. | 358/84 |
| 5,109,414 | A | 4/1992 | Harvey et al. | |
| 5,113,496 | A | 5/1992 | McCalley et al. | |
| 5,119,188 | A | 6/1992 | McCalley et al. | 358/86 |
| 5,130,792 | A | 7/1992 | Tindell et al. | 358/85 |
| 5,132,992 | A | 7/1992 | Yurt et al. | |
| 5,133,009 | A | 7/1992 | Rumreich | |
| 5,133,079 | A | 7/1992 | Ballantyne et al. | |
| 5,136,411 | A | 8/1992 | Paik et al. | |
| 5,142,575 | A | 8/1992 | Farmer et al. | |
| 5,144,448 | A | 9/1992 | Hornbaker, III et al. | |
| 5,155,591 | A | 10/1992 | Wachob | |
| 5,172,413 | A | 12/1992 | Bradley et al. | |
| 5,191,410 | A | 3/1993 | McCalley et al. | |
| 5,195,092 | A | 3/1993 | Wilson et al. | |
| 5,208,665 | A | 5/1993 | McCalley et al. | |
| 5,220,420 | A | 6/1993 | Hoarty et al. | 358/86 |
| 5,230,019 | A | 7/1993 | Yanagimichi et al. | |
| 5,231,494 | A | 7/1993 | Wachob | |
| 5,236,199 | A | 8/1993 | Thompson, Jr. | |
| 5,247,347 | A | 9/1993 | Letteral et al. | 358/85 |
| 5,253,341 | A | 10/1993 | Rozmanith et al. | |
| 5,262,854 | A | 11/1993 | Ng | |
| 5,262,860 | A | 11/1993 | Fitzpatrick et al. | |
| 5,303,388 | A | 4/1994 | Kreitman et al. | |

(56) References Cited

U.S. PATENT DOCUMENTS

| | | | | |
|---|---|---|---|---|
| 5,319,455 | A | 6/1994 | Hoarty et al. | 348/7 |
| 5,319,707 | A | 6/1994 | Wasilewski et al. | |
| 5,321,440 | A | 6/1994 | Yanagihara et al. | |
| 5,321,514 | A | 6/1994 | Martinez | |
| 5,351,129 | A | 9/1994 | Lai | |
| 5,355,162 | A | 10/1994 | Yazolino et al. | |
| 5,359,601 | A | 10/1994 | Wasilewski et al. | |
| 5,361,091 | A | 11/1994 | Hoarty et al. | 348/7 |
| 5,371,532 | A | 12/1994 | Gelman et al. | |
| 5,404,393 | A | 4/1995 | Remillard | |
| 5,408,274 | A | 4/1995 | Chang et al. | |
| 5,410,343 | A | 4/1995 | Coddington et al. | 348/7 |
| 5,410,344 | A | 4/1995 | Graves et al. | |
| 5,412,415 | A | 5/1995 | Cook et al. | |
| 5,412,720 | A | 5/1995 | Hoarty | 380/15 |
| 5,418,559 | A | 5/1995 | Blahut | 348/10 |
| 5,422,674 | A | 6/1995 | Hooper et al. | 348/409 |
| 5,422,887 | A | 6/1995 | Diepstraten et al. | |
| 5,442,389 | A | 8/1995 | Blahut et al. | 348/7 |
| 5,442,390 | A | 8/1995 | Hooper et al. | 348/7 |
| 5,442,700 | A | 8/1995 | Snell et al. | 380/15 |
| 5,446,490 | A | 8/1995 | Blahut et al. | |
| 5,469,283 | A | 11/1995 | Vinel et al. | |
| 5,469,431 | A | 11/1995 | Wendorf et al. | |
| 5,471,263 | A | 11/1995 | Odaka | |
| 5,481,542 | A | 1/1996 | Logston et al. | |
| 5,485,197 | A | 1/1996 | Hoarty | 348/7 |
| 5,487,066 | A | 1/1996 | McNamara et al. | |
| 5,493,638 | A | 2/1996 | Hooper et al. | |
| 5,495,283 | A | 2/1996 | Cowe | |
| 5,495,295 | A | 2/1996 | Long | |
| 5,497,187 | A | 3/1996 | Banker et al. | |
| 5,517,250 | A | 5/1996 | Hoogenboom et al. | |
| 5,526,034 | A | 6/1996 | Hoarty et al. | 348/7 |
| 5,528,281 | A | 6/1996 | Grady et al. | 348/7 |
| 5,537,397 | A | 7/1996 | Abramson | |
| 5,537,404 | A | 7/1996 | Bentley et al. | |
| 5,539,449 | A | 7/1996 | Blahut et al. | 348/7 |
| RE35,314 | E | 8/1996 | Logg | |
| 5,548,340 | A | 8/1996 | Bertram | 348/559 |
| 5,550,578 | A | 8/1996 | Hoarty et al. | 348/7 |
| 5,557,316 | A | 9/1996 | Hoarty et al. | 348/7 |
| 5,559,549 | A | 9/1996 | Hendricks et al. | |
| 5,561,708 | A | 10/1996 | Remillard | |
| 5,570,126 | A | 10/1996 | Blahut et al. | |
| 5,570,363 | A | 10/1996 | Holm | |
| 5,579,143 | A | 11/1996 | Huber | |
| 5,581,653 | A | 12/1996 | Todd | |
| 5,583,927 | A | 12/1996 | Ely et al. | |
| 5,587,734 | A | 12/1996 | Lauder et al. | 348/10 |
| 5,589,885 | A | 12/1996 | Ooi | |
| 5,592,470 | A | 1/1997 | Rudrapatna et al. | |
| 5,594,507 | A | 1/1997 | Hoarty | 348/584 |
| 5,594,723 | A | 1/1997 | Tibi | |
| 5,594,938 | A | 1/1997 | Engel | |
| 5,596,693 | A | 1/1997 | Needle et al. | |
| 5,600,364 | A | 2/1997 | Hendricks et al. | |
| 5,600,573 | A | 2/1997 | Hendricks et al. | |
| 5,608,446 | A | 3/1997 | Carr et al. | |
| 5,617,145 | A | 4/1997 | Huang et al. | |
| 5,621,464 | A | 4/1997 | Teo et al. | |
| 5,625,404 | A | 4/1997 | Grady et al. | 348/7 |
| 5,630,757 | A | 5/1997 | Gagin et al. | |
| 5,631,693 | A | 5/1997 | Wunderlich et al. | |
| 5,631,846 | A | 5/1997 | Szurkowski | |
| 5,632,003 | A | 5/1997 | Davidson et al. | |
| 5,649,283 | A | 7/1997 | Galler et al. | |
| 5,668,592 | A | 9/1997 | Spaulding, II | |
| 5,668,599 | A | 9/1997 | Cheney et al. | |
| 5,708,767 | A | 1/1998 | Yeo et al. | |
| 5,710,815 | A | 1/1998 | Ming et al. | |
| 5,712,906 | A | 1/1998 | Grady et al. | 379/93.17 |
| 5,740,307 | A | 4/1998 | Lane | |
| 5,742,289 | A | 4/1998 | Naylor et al. | |
| 5,748,234 | A | 5/1998 | Lippincott | |
| 5,754,941 | A | 5/1998 | Sharpe et al. | |
| 5,786,527 | A | 7/1998 | Tarte | |
| 5,790,174 | A | 8/1998 | Richard, III et al. | 348/7 |
| 5,802,283 | A | 9/1998 | Grady et al. | 395/200 |
| 5,812,665 | A | 9/1998 | Hoarty et al. | 380/10 |
| 5,812,786 | A | 9/1998 | Seazholtz et al. | |
| 5,815,604 | A | 9/1998 | Simons et al. | |
| 5,818,438 | A | 10/1998 | Howe et al. | |
| 5,821,945 | A | 10/1998 | Yeo et al. | |
| 5,822,537 | A | 10/1998 | Katseff et al. | |
| 5,828,371 | A | 10/1998 | Cline et al. | |
| 5,844,594 | A | 12/1998 | Ferguson | |
| 5,845,083 | A | 12/1998 | Hamadani et al. | |
| 5,862,325 | A | 1/1999 | Reed et al. | |
| 5,864,820 | A | 1/1999 | Case | |
| 5,867,208 | A | 2/1999 | McLaren | |
| 5,883,661 | A | 3/1999 | Hoarty | 348/7 |
| 5,903,727 | A | 5/1999 | Nielsen | 395/200.42 |
| 5,903,816 | A | 5/1999 | Broadwin et al. | |
| 5,905,522 | A | 5/1999 | Lawler | |
| 5,907,681 | A | 5/1999 | Bates et al. | |
| 5,917,822 | A | 6/1999 | Lyles et al. | |
| 5,946,352 | A | 8/1999 | Rowlands et al. | |
| 5,952,943 | A | 9/1999 | Walsh et al. | |
| 5,959,690 | A | 9/1999 | Toebes et al. | |
| 5,961,603 | A | 10/1999 | Kunkel et al. | |
| 5,963,203 | A | 10/1999 | Goldberg et al. | |
| 5,966,163 | A | 10/1999 | Lin et al. | |
| 5,978,756 | A | 11/1999 | Walker et al. | |
| 5,982,445 | A | 11/1999 | Eyer et al. | |
| 5,990,862 | A | 11/1999 | Lewis | |
| 5,995,146 | A | 11/1999 | Rasmusse | |
| 5,995,488 | A | 11/1999 | Kalkunte et al. | |
| 5,999,970 | A | 12/1999 | Krisbergh et al. | |
| 6,014,416 | A | 1/2000 | Shin et al. | |
| 6,021,386 | A | 2/2000 | Davis et al. | |
| 6,031,989 | A | 2/2000 | Cordell | |
| 6,034,678 | A | 3/2000 | Hoarty et al. | 345/327 |
| 6,049,539 | A | 4/2000 | Lee et al. | |
| 6,049,831 | A | 4/2000 | Gardell et al. | |
| 6,052,555 | A | 4/2000 | Ferguson | |
| 6,055,314 | A | 4/2000 | Spies et al. | |
| 6,055,315 | A | 4/2000 | Doyle et al. | 380/242 |
| 6,064,377 | A | 5/2000 | Hoarty et al. | 345/327 |
| 6,078,328 | A | 6/2000 | Schumann et al. | |
| 6,084,908 | A | 7/2000 | Chiang et al. | |
| 6,100,883 | A | 8/2000 | Hoarty | 345/327 |
| 6,108,625 | A | 8/2000 | Kim | |
| 6,131,182 | A | 10/2000 | Beakes et al. | |
| 6,141,645 | A | 10/2000 | Chi-Min et al. | |
| 6,141,693 | A | 10/2000 | Perlman et al. | 709/236 |
| 6,144,698 | A | 11/2000 | Poon et al. | |
| 6,167,084 | A | 12/2000 | Wang et al. | |
| 6,169,573 | B1 | 1/2001 | Sampath-Kumar et al. | |
| 6,177,931 | B1 | 1/2001 | Alexander et al. | |
| 6,182,072 | B1 | 1/2001 | Leak et al. | |
| 6,184,878 | B1* | 2/2001 | Alonso et al. | 725/109 |
| 6,192,081 | B1 | 2/2001 | Chiang et al. | |
| 6,198,822 | B1 | 3/2001 | Doyle et al. | 380/210 |
| 6,205,582 | B1 | 3/2001 | Hoarty | 725/93 |
| 6,226,041 | B1 | 5/2001 | Florencio et al. | |
| 6,236,730 | B1 | 5/2001 | Cowieson et al. | |
| 6,243,418 | B1 | 6/2001 | Kim | |
| 6,253,238 | B1 | 6/2001 | Lauder et al. | 709/217 |
| 6,256,047 | B1 | 7/2001 | Isobe et al. | |
| 6,259,826 | B1 | 7/2001 | Pollard et al. | |
| 6,266,369 | B1 | 7/2001 | Wang et al. | |
| 6,266,684 | B1 | 7/2001 | Kraus et al. | |
| 6,275,496 | B1* | 8/2001 | Burns et al. | 370/429 |
| 6,292,194 | B1 | 9/2001 | Powell, III | |
| 6,305,020 | B1 | 10/2001 | Hoarty et al. | 725/95 |
| 6,317,151 | B1 | 11/2001 | Ohsuga et al. | |
| 6,317,885 | B1 | 11/2001 | Fries | |
| 6,349,284 | B1 | 2/2002 | Park et al. | |
| 6,386,980 | B1 | 5/2002 | Nishino et al. | |
| 6,389,075 | B2 | 5/2002 | Wang et al. | 375/240.16 |
| 6,446,037 | B1 | 9/2002 | Fielder et al. | |
| 6,459,427 | B1 | 10/2002 | Mao et al. | |
| 6,481,012 | B1 | 11/2002 | Gordon et al. | |

(56) References Cited

U.S. PATENT DOCUMENTS

| | | |
|---|---|---|
| 6,512,793 B1 | 1/2003 | Maeda |
| 6,525,746 B1 | 2/2003 | Lau et al. |
| 6,536,043 B1 | 3/2003 | Guedalia |
| 6,557,041 B2 | 4/2003 | Mallart |
| 6,560,496 B1 | 5/2003 | Michener |
| 6,564,378 B1 | 5/2003 | Satterfield et al. |
| 6,578,201 B1 | 6/2003 | LaRocca et al. |
| 6,579,184 B1 | 6/2003 | Tanskanen |
| 6,584,153 B1 | 6/2003 | Gordon et al. |
| 6,588,017 B1 | 7/2003 | Calderone |
| 6,598,229 B2 | 7/2003 | Smyth et al. |
| 6,604,224 B1 | 8/2003 | Armstrong et al. |
| 6,614,442 B1 | 9/2003 | Ouyang et al. |
| 6,621,870 B1 | 9/2003 | Gordon et al. |
| 6,625,574 B1 | 9/2003 | Taniguchi et al. |
| 6,639,896 B1 | 10/2003 | Goode et al. |
| 6,645,076 B1 | 11/2003 | Sugai |
| 6,651,252 B1 | 11/2003 | Gordon et al. |
| 6,657,647 B1 | 12/2003 | Bright |
| 6,675,385 B1 | 1/2004 | Wang |
| 6,675,387 B1 | 1/2004 | Boucher |
| 6,681,326 B2 | 1/2004 | Son et al. |
| 6,681,397 B1 | 1/2004 | Tsai et al. |
| 6,684,400 B1 | 1/2004 | Goode et al. |
| 6,687,663 B1 | 2/2004 | McGrath et al. |
| 6,691,208 B2 | 2/2004 | Dandrea et al. |
| 6,697,376 B1 | 2/2004 | Son et al. |
| 6,704,359 B1 | 3/2004 | Bayrakeri et al. |
| 6,717,600 B2 | 4/2004 | Dutta et al. |
| 6,718,552 B1 | 4/2004 | Goode |
| 6,721,794 B2 | 4/2004 | Taylor et al. |
| 6,721,956 B2 | 4/2004 | Wasilewski |
| 6,727,929 B1 | 4/2004 | Bates et al. |
| 6,732,370 B1 | 5/2004 | Gordon et al. |
| 6,747,991 B1 | 6/2004 | Hemy et al. |
| 6,754,271 B1 | 6/2004 | Gordon et al. |
| 6,754,905 B2 | 6/2004 | Gordon et al. |
| 6,758,540 B1 | 7/2004 | Adolph et al. |
| 6,766,407 B1 | 7/2004 | Lisitsa et al. |
| 6,771,704 B1 | 8/2004 | Hannah |
| 6,785,902 B1 | 8/2004 | Zigmond et al. |
| 6,807,528 B1 | 10/2004 | Truman et al. |
| 6,810,528 B1 | 10/2004 | Chatani |
| 6,817,947 B2 | 11/2004 | Tanskanen |
| 6,886,178 B1 | 4/2005 | Mao et al. |
| 6,907,574 B2 | 6/2005 | Xu et al. .................. 715/767 |
| 6,931,291 B1 | 8/2005 | Alvarez-Tinoco et al. |
| 6,941,019 B1 | 9/2005 | Mitchell et al. |
| 6,941,574 B1 | 9/2005 | Broadwin et al. |
| 6,947,509 B1 | 9/2005 | Wong |
| 6,952,221 B1 | 10/2005 | Holtz et al. |
| 6,956,899 B2 | 10/2005 | Hall et al. |
| 7,030,890 B1 | 4/2006 | Jouet et al. |
| 7,050,113 B2 | 5/2006 | Campisano et al. |
| 7,089,577 B1 | 8/2006 | Rakib et al. |
| 7,095,402 B2 | 8/2006 | Kunii et al. |
| 7,114,167 B2 | 9/2006 | Slemmer et al. |
| 7,146,615 B1 | 12/2006 | Hervet et al. |
| 7,158,676 B1 | 1/2007 | Rainsford |
| 7,200,836 B2 | 4/2007 | Brodersen et al. |
| 7,212,573 B2 | 5/2007 | Winger |
| 7,224,731 B2 | 5/2007 | Mehrotra |
| 7,272,556 B1 | 9/2007 | Aguilar et al. |
| 7,310,619 B2 | 12/2007 | Baar et al. |
| 7,325,043 B1 | 1/2008 | Rosenberg et al. |
| 7,346,111 B2 | 3/2008 | Winger et al. |
| 7,360,230 B1 | 4/2008 | Paz et al. |
| 7,412,423 B1 | 8/2008 | Asano |
| 7,412,505 B2 | 8/2008 | Slemmer et al. |
| 7,421,082 B2 | 9/2008 | Kamiya et al. |
| 7,444,306 B2 | 10/2008 | Varble |
| 7,444,418 B2 | 10/2008 | Chou et al. |
| 7,500,235 B2 | 3/2009 | Maynard et al. |
| 7,508,941 B1 | 3/2009 | O'Toole, Jr. et al. |
| 7,512,577 B2 | 3/2009 | Slemmer et al. |
| 7,543,073 B2 | 6/2009 | Chou et al. |
| 7,596,764 B2 | 9/2009 | Vienneau et al. |
| 7,623,575 B2 | 11/2009 | Winger |
| 7,669,220 B2 | 2/2010 | Goode |
| 7,742,609 B2 | 6/2010 | Yeakel et al. |
| 7,743,400 B2 | 6/2010 | Kurauchi |
| 7,751,572 B2 | 7/2010 | Villemoes et al. |
| 7,757,157 B1 | 7/2010 | Fukuda |
| 7,830,388 B1 | 11/2010 | Lu |
| 7,840,905 B1 | 11/2010 | Weber et al. |
| 7,936,819 B2 | 5/2011 | Craig et al. |
| 7,970,263 B1 | 6/2011 | Asch |
| 7,987,489 B2 | 7/2011 | Krzyzanowski et al. |
| 8,027,353 B2 | 9/2011 | Damola et al. |
| 8,036,271 B2 | 10/2011 | Winger et al. |
| 8,046,798 B1 | 10/2011 | Schlack et al. |
| 8,074,248 B2 | 12/2011 | Sigmon, Jr. et al. |
| 8,118,676 B2 | 2/2012 | Craig et al. |
| 8,136,033 B1 | 3/2012 | Bhargava et al. |
| 8,149,917 B2 | 4/2012 | Zhang et al. |
| 8,155,194 B2 | 4/2012 | Winger et al. |
| 8,155,202 B2 | 4/2012 | Landau |
| 8,170,107 B2 | 5/2012 | Winger |
| 8,194,862 B2 | 6/2012 | Herr et al. |
| 8,243,630 B2 | 8/2012 | Luo et al. |
| 8,270,439 B2 | 9/2012 | Herr et al. |
| 8,284,842 B2 | 10/2012 | Craig et al. |
| 8,296,424 B2 | 10/2012 | Malloy et al. |
| 8,370,869 B2 | 2/2013 | Paek et al. |
| 8,411,754 B2 | 4/2013 | Zhang et al. |
| 8,442,110 B2 | 5/2013 | Pavlovskaia et al. |
| 8,473,996 B2 | 6/2013 | Gordon et al. |
| 8,619,867 B2 | 12/2013 | Craig et al. |
| 8,621,500 B2 | 12/2013 | Weaver et al. |
| 2001/0008845 A1 | 7/2001 | Kusuda et al. |
| 2001/0049301 A1 | 12/2001 | Masuda et al. |
| 2002/0007491 A1 | 1/2002 | Schiller et al. |
| 2002/0013812 A1 | 1/2002 | Krueger et al. |
| 2002/0016161 A1 | 2/2002 | Dellien et al. |
| 2002/0021353 A1 | 2/2002 | DeNies |
| 2002/0026642 A1 | 2/2002 | Augenbraun et al. |
| 2002/0027567 A1* | 3/2002 | Niamir .................. 345/738 |
| 2002/0032697 A1 | 3/2002 | French et al. |
| 2002/0040482 A1 | 4/2002 | Sextro et al. |
| 2002/0047899 A1 | 4/2002 | Son et al. |
| 2002/0049975 A1 | 4/2002 | Thomas et al. |
| 2002/0056083 A1 | 5/2002 | Istvan |
| 2002/0056107 A1 | 5/2002 | Schlack |
| 2002/0056136 A1 | 5/2002 | Wistendahl et al. |
| 2002/0059644 A1 | 5/2002 | Andrade et al. |
| 2002/0062484 A1 | 5/2002 | De Lange et al. |
| 2002/0067766 A1 | 6/2002 | Sakamoto et al. ............ 375/240 |
| 2002/0069267 A1 | 6/2002 | Thiele |
| 2002/0072408 A1 | 6/2002 | Kumagai |
| 2002/0078171 A1* | 6/2002 | Schneider ................ 709/218 |
| 2002/0078456 A1 | 6/2002 | Hudson et al. |
| 2002/0083464 A1 | 6/2002 | Tomsen et al. |
| 2002/0095689 A1 | 7/2002 | Novak |
| 2002/0105531 A1 | 8/2002 | Niemi |
| 2002/0108121 A1 | 8/2002 | Alao et al. |
| 2002/0131511 A1 | 9/2002 | Zenoni |
| 2002/0136298 A1 | 9/2002 | Anantharamu et al. . 375/240.12 |
| 2002/0152318 A1 | 10/2002 | Menon et al. |
| 2002/0171765 A1 | 11/2002 | Waki et al. |
| 2002/0175931 A1 | 11/2002 | Holtz et al. |
| 2002/0178447 A1 | 11/2002 | Plotnick et al. |
| 2002/0188628 A1 | 12/2002 | Cooper et al. |
| 2002/0191851 A1 | 12/2002 | Keinan |
| 2002/0194592 A1 | 12/2002 | Tsuchida et al. |
| 2002/0196746 A1 | 12/2002 | Allen |
| 2003/0020671 A1 | 1/2003 | Santoro et al. |
| 2003/0027517 A1 | 2/2003 | Callway et al. |
| 2003/0035486 A1 | 2/2003 | Kato et al. |
| 2003/0038893 A1 | 2/2003 | Rajamaki et al. |
| 2003/0046690 A1 | 3/2003 | Miller |
| 2003/0051253 A1 | 3/2003 | Barone, Jr. |
| 2003/0058941 A1 | 3/2003 | Chen et al. |
| 2003/0061451 A1 | 3/2003 | Beyda |
| 2003/0065739 A1 | 4/2003 | Shnier |

(56) References Cited

U.S. PATENT DOCUMENTS

| | | |
|---|---|---|
| 2003/0071792 A1 | 4/2003 | Safadi |
| 2003/0072372 A1 | 4/2003 | Shen et al. |
| 2003/0076546 A1 | 4/2003 | Johnson et al. |
| 2003/0088328 A1 | 5/2003 | Nishio et al. |
| 2003/0088400 A1 | 5/2003 | Nishio et al. |
| 2003/0095790 A1 | 5/2003 | Joshi |
| 2003/0107443 A1 | 6/2003 | Yamamoto |
| 2003/0122836 A1 | 7/2003 | Doyle et al. |
| 2003/0123664 A1 | 7/2003 | Pedlow, Jr. et al. |
| 2003/0126608 A1 | 7/2003 | Safadi et al. |
| 2003/0126611 A1 | 7/2003 | Chernock et al. |
| 2003/0131349 A1 | 7/2003 | Kuczynski-Brown |
| 2003/0135860 A1 | 7/2003 | Dureau ............... 725/82 |
| 2003/0169373 A1 | 9/2003 | Peters et al. |
| 2003/0177199 A1 | 9/2003 | Zenoni |
| 2003/0188309 A1 | 10/2003 | Yuen |
| 2003/0189980 A1 | 10/2003 | Dvir et al. |
| 2003/0196174 A1 | 10/2003 | Pierre Cote et al. |
| 2003/0208768 A1 | 11/2003 | Urdang et al. |
| 2003/0229719 A1 | 12/2003 | Iwata et al. |
| 2003/0229900 A1 | 12/2003 | Reisman |
| 2003/0231218 A1 | 12/2003 | Amadio |
| 2004/0016000 A1 | 1/2004 | Zhang et al. |
| 2004/0034873 A1 | 2/2004 | Zenoni |
| 2004/0040035 A1 | 2/2004 | Carlucci et al. |
| 2004/0078822 A1 | 4/2004 | Breen et al. |
| 2004/0088375 A1 | 5/2004 | Sethi et al. |
| 2004/0091171 A1 | 5/2004 | Bone |
| 2004/0111526 A1* | 6/2004 | Baldwin et al. ............ 709/231 |
| 2004/0117827 A1 | 6/2004 | Karaoguz et al. |
| 2004/0128686 A1 | 7/2004 | Boyer et al. |
| 2004/0133704 A1 | 7/2004 | Krzyzanowski et al. |
| 2004/0136698 A1 | 7/2004 | Mock |
| 2004/0139158 A1 | 7/2004 | Datta |
| 2004/0157662 A1 | 8/2004 | Tsuchiya |
| 2004/0163101 A1 | 8/2004 | Swix et al. |
| 2004/0184542 A1 | 9/2004 | Fujimoto |
| 2004/0193648 A1 | 9/2004 | Lai et al. ............ 707/104.1 |
| 2004/0210824 A1 | 10/2004 | Shoff et al. |
| 2004/0261106 A1 | 12/2004 | Hoffman |
| 2004/0261114 A1 | 12/2004 | Addington et al. |
| 2005/0015259 A1 | 1/2005 | Thumpudi et al. |
| 2005/0015816 A1 | 1/2005 | Christofalo et al. |
| 2005/0021830 A1 | 1/2005 | Urzaiz et al. |
| 2005/0034155 A1 | 2/2005 | Gordon et al. |
| 2005/0034162 A1 | 2/2005 | White et al. |
| 2005/0044575 A1 | 2/2005 | Der Kuyl |
| 2005/0055685 A1 | 3/2005 | Maynard et al. |
| 2005/0055721 A1 | 3/2005 | Zigmond et al. |
| 2005/0071876 A1 | 3/2005 | van Beek |
| 2005/0076134 A1 | 4/2005 | Bialik et al. |
| 2005/0089091 A1 | 4/2005 | Kim et al. |
| 2005/0091690 A1 | 4/2005 | Delpuch et al. |
| 2005/0091695 A1 | 4/2005 | Paz et al. |
| 2005/0105608 A1 | 5/2005 | Coleman et al. |
| 2005/0114906 A1 | 5/2005 | Hoarty et al. |
| 2005/0132305 A1 | 6/2005 | Guichard et al. |
| 2005/0135385 A1 | 6/2005 | Jenkins et al. |
| 2005/0141613 A1 | 6/2005 | Kelly et al. |
| 2005/0149988 A1 | 7/2005 | Grannan |
| 2005/0160088 A1 | 7/2005 | Scallan et al. |
| 2005/0166257 A1 | 7/2005 | Feinleib et al. |
| 2005/0180502 A1 | 8/2005 | Puri |
| 2005/0198682 A1 | 9/2005 | Wright |
| 2005/0213586 A1 | 9/2005 | Cyganski et al. |
| 2005/0216933 A1 | 9/2005 | Black |
| 2005/0216940 A1 | 9/2005 | Black |
| 2005/0226426 A1 | 10/2005 | Oomen et al. |
| 2005/0273832 A1 | 12/2005 | Zigmond et al. |
| 2005/0283741 A1 | 12/2005 | Balabanovic et al. |
| 2006/0001737 A1 | 1/2006 | Dawson et al. |
| 2006/0020960 A1 | 1/2006 | Relan et al. |
| 2006/0020994 A1 | 1/2006 | Crane et al. |
| 2006/0031906 A1 | 2/2006 | Kaneda |
| 2006/0039481 A1 | 2/2006 | Shen et al. |
| 2006/0041910 A1 | 2/2006 | Hatanaka et al. |
| 2006/0088105 A1 | 4/2006 | Shen et al. |
| 2006/0095944 A1 | 5/2006 | Demircin et al. |
| 2006/0112338 A1 | 5/2006 | Joung et al. |
| 2006/0117340 A1 | 6/2006 | Pavlovskaia et al. |
| 2006/0143678 A1 | 6/2006 | Cho et al. |
| 2006/0161538 A1 | 7/2006 | Kiilerich ............... 707/4 |
| 2006/0173985 A1 | 8/2006 | Moore |
| 2006/0174026 A1 | 8/2006 | Robinson et al. |
| 2006/0174289 A1 | 8/2006 | Theberge |
| 2006/0195884 A1 | 8/2006 | van Zoest et al. |
| 2006/0212203 A1 | 9/2006 | Furuno |
| 2006/0218601 A1 | 9/2006 | Michel |
| 2006/0230428 A1 | 10/2006 | Craig et al. |
| 2006/0242570 A1 | 10/2006 | Croft et al. |
| 2006/0256865 A1 | 11/2006 | Westerman |
| 2006/0269086 A1 | 11/2006 | Page et al. |
| 2006/0271985 A1 | 11/2006 | Hoffman et al. |
| 2006/0285586 A1 | 12/2006 | Westerman |
| 2006/0285819 A1 | 12/2006 | Kelly et al. |
| 2007/0009035 A1 | 1/2007 | Craig et al. |
| 2007/0009036 A1 | 1/2007 | Craig et al. |
| 2007/0009042 A1 | 1/2007 | Craig et al. |
| 2007/0025639 A1 | 2/2007 | Zhou et al. |
| 2007/0033528 A1 | 2/2007 | Merrit et al. |
| 2007/0033631 A1 | 2/2007 | Gordon et al. |
| 2007/0074251 A1 | 3/2007 | Oguz et al. |
| 2007/0079325 A1 | 4/2007 | de Heer |
| 2007/0115941 A1 | 5/2007 | Patel et al. |
| 2007/0124282 A1 | 5/2007 | Wittkotter |
| 2007/0124795 A1 | 5/2007 | McKissick et al. |
| 2007/0130446 A1 | 6/2007 | Minakami |
| 2007/0130592 A1 | 6/2007 | Haeusel |
| 2007/0152984 A1 | 7/2007 | Ording et al. |
| 2007/0162953 A1 | 7/2007 | Bolliger et al. |
| 2007/0172061 A1 | 7/2007 | Pinder |
| 2007/0174790 A1 | 7/2007 | Jing et al. |
| 2007/0237232 A1 | 10/2007 | Chang et al. |
| 2007/0300280 A1 | 12/2007 | Turner et al. |
| 2008/0046928 A1 | 2/2008 | Poling et al. |
| 2008/0052742 A1 | 2/2008 | Kopf et al. |
| 2008/0066135 A1 | 3/2008 | Brodersen et al. |
| 2008/0084503 A1 | 4/2008 | Kondo |
| 2008/0086688 A1 | 4/2008 | Chandratillake et al. |
| 2008/0094368 A1 | 4/2008 | Ording et al. |
| 2008/0098450 A1 | 4/2008 | Wu et al. |
| 2008/0104520 A1 | 5/2008 | Swenson et al. |
| 2008/0127255 A1 | 5/2008 | Ress et al. |
| 2008/0154583 A1 | 6/2008 | Goto et al. |
| 2008/0163059 A1 | 7/2008 | Craner |
| 2008/0163286 A1 | 7/2008 | Rudolph et al. |
| 2008/0170619 A1 | 7/2008 | Landau |
| 2008/0170622 A1 | 7/2008 | Gordon et al. |
| 2008/0178125 A1 | 7/2008 | Elsbree et al. |
| 2008/0178243 A1 | 7/2008 | Dong et al. |
| 2008/0178249 A1 | 7/2008 | Gordon et al. |
| 2008/0189740 A1 | 8/2008 | Carpenter et al. |
| 2008/0195573 A1 | 8/2008 | Onoda et al. |
| 2008/0201736 A1 | 8/2008 | Gordon et al. |
| 2008/0212942 A1 | 9/2008 | Gordon et al. |
| 2008/0232452 A1 | 9/2008 | Sullivan et al. |
| 2008/0243918 A1 | 10/2008 | Holtman |
| 2008/0243998 A1 | 10/2008 | Oh et al. |
| 2008/0246759 A1 | 10/2008 | Summers |
| 2008/0253440 A1 | 10/2008 | Srinivasan et al. |
| 2008/0271080 A1 | 10/2008 | Gossweiler et al. |
| 2009/0003446 A1 | 1/2009 | Wu et al. |
| 2009/0003705 A1 | 1/2009 | Zou et al. |
| 2009/0007199 A1 | 1/2009 | La Joie |
| 2009/0025027 A1 | 1/2009 | Craner |
| 2009/0031341 A1 | 1/2009 | Schlack et al. |
| 2009/0041118 A1 | 2/2009 | Pavlovskaia et al. |
| 2009/0083781 A1 | 3/2009 | Yang et al. |
| 2009/0083813 A1 | 3/2009 | Dolce et al. |
| 2009/0083824 A1 | 3/2009 | McCarthy et al. |
| 2009/0089188 A1 | 4/2009 | Ku et al. |
| 2009/0094113 A1 | 4/2009 | Berry et al. |
| 2009/0094646 A1 | 4/2009 | Walter et al. |
| 2009/0100465 A1 | 4/2009 | Kulakowski |

(56) References Cited

U.S. PATENT DOCUMENTS

| | | |
|---|---|---|
| 2009/0100489 A1 | 4/2009 | Strothmann |
| 2009/0106269 A1 | 4/2009 | Zuckerman et al. |
| 2009/0106386 A1 | 4/2009 | Zuckerman et al. |
| 2009/0106392 A1 | 4/2009 | Zuckerman et al. |
| 2009/0106425 A1 | 4/2009 | Zuckerman et al. |
| 2009/0106441 A1 | 4/2009 | Zuckerman et al. |
| 2009/0106451 A1 | 4/2009 | Zuckerman et al. |
| 2009/0106511 A1 | 4/2009 | Zuckerman et al. |
| 2009/0113009 A1 | 4/2009 | Slemmer et al. |
| 2009/0132942 A1 | 5/2009 | Santoro et al. |
| 2009/0138966 A1 | 5/2009 | Krause et al. |
| 2009/0144781 A1 | 6/2009 | Glaser et al. |
| 2009/0146779 A1 | 6/2009 | Kumar et al. |
| 2009/0157868 A1 | 6/2009 | Chaudhry |
| 2009/0158369 A1 | 6/2009 | Van Vleck et al. |
| 2009/0160694 A1 | 6/2009 | Di Flora |
| 2009/0172757 A1 | 7/2009 | Aldrey et al. |
| 2009/0178098 A1 | 7/2009 | Westbrook et al. |
| 2009/0183219 A1 | 7/2009 | Maynard et al. |
| 2009/0189890 A1 | 7/2009 | Corbett et al. |
| 2009/0193452 A1 | 7/2009 | Russ et al. |
| 2009/0196346 A1 | 8/2009 | Zhang et al. |
| 2009/0204920 A1 | 8/2009 | Beverley et al. |
| 2009/0210899 A1 | 8/2009 | Lawrence-Apfelbaum et al. |
| 2009/0225790 A1 | 9/2009 | Shay et al. |
| 2009/0228620 A1 | 9/2009 | Thomas et al. |
| 2009/0228922 A1 | 9/2009 | Haj-Khalil et al. |
| 2009/0233593 A1 | 9/2009 | Ergen et al. |
| 2009/0251478 A1 | 10/2009 | Maillot et al. |
| 2009/0254960 A1 | 10/2009 | Yarom et al. |
| 2009/0265617 A1 | 10/2009 | Randall et al. |
| 2009/0271512 A1 | 10/2009 | Jorgensen |
| 2009/0271818 A1 | 10/2009 | Schlack |
| 2009/0298535 A1 | 12/2009 | Klein et al. |
| 2009/0313674 A1 | 12/2009 | Ludvig et al. |
| 2009/0328109 A1 | 12/2009 | Pavlovskaia et al. |
| 2010/0033638 A1 | 2/2010 | O'Donnell et al. |
| 2010/0035682 A1 | 2/2010 | Gentile et al. |
| 2010/0058404 A1 | 3/2010 | Rouse |
| 2010/0067571 A1 | 3/2010 | White et al. |
| 2010/0077441 A1 | 3/2010 | Thomas et al. |
| 2010/0104021 A1 | 4/2010 | Schmit |
| 2010/0115573 A1 | 5/2010 | Srinivasan et al. |
| 2010/0118972 A1 | 5/2010 | Zhang et al. |
| 2010/0131996 A1 | 5/2010 | Gauld |
| 2010/0146139 A1 | 6/2010 | Brockmann |
| 2010/0158109 A1 | 6/2010 | Dahlby et al. |
| 2010/0166071 A1 | 7/2010 | Wu et al. |
| 2010/0174776 A1 | 7/2010 | Westberg et al. |
| 2010/0175080 A1 | 7/2010 | Yuen et al. |
| 2010/0180307 A1 | 7/2010 | Hayes et al. |
| 2010/0211983 A1 | 8/2010 | Chou |
| 2010/0226428 A1 | 9/2010 | Thevathasan et al. |
| 2010/0235861 A1 | 9/2010 | Schein et al. |
| 2010/0242073 A1 | 9/2010 | Gordon et al. |
| 2010/0251167 A1 | 9/2010 | DeLuca et al. |
| 2010/0254370 A1 | 10/2010 | Jana et al. |
| 2010/0325655 A1 | 12/2010 | Perez |
| 2011/0002376 A1 | 1/2011 | Ahmed et al. |
| 2011/0002470 A1 | 1/2011 | Purnhagen et al. |
| 2011/0023069 A1 | 1/2011 | Dowens |
| 2011/0035227 A1 | 2/2011 | Lee et al. |
| 2011/0067061 A1 | 3/2011 | Karaoguz et al. |
| 2011/0096828 A1 | 4/2011 | Chen et al. |
| 2011/0107375 A1 | 5/2011 | Stahl et al. |
| 2011/0110642 A1 | 5/2011 | Salomons et al. |
| 2011/0150421 A1 | 6/2011 | Sasaki et al. |
| 2011/0153776 A1 | 6/2011 | Opala et al. |
| 2011/0167468 A1 | 7/2011 | Lee et al. |
| 2011/0191684 A1 | 8/2011 | Greenberg |
| 2011/0243024 A1 | 10/2011 | Osterling et al. |
| 2011/0258584 A1 | 10/2011 | Williams et al. |
| 2011/0289536 A1 | 11/2011 | Poder et al. |
| 2011/0317982 A1 | 12/2011 | Xu et al. |
| 2012/0023126 A1 | 1/2012 | Jin et al. |
| 2012/0030212 A1 | 2/2012 | Koopmans et al. |
| 2012/0137337 A1 | 5/2012 | Sigmon et al. |
| 2012/0204217 A1 | 8/2012 | Regis et al. |
| 2012/0209815 A1 | 8/2012 | Carson et al. |
| 2012/0224641 A1 | 9/2012 | Haberman et al. |
| 2012/0257671 A1 | 10/2012 | Brockmann et al. |
| 2013/0003826 A1 | 1/2013 | Craig et al. |
| 2013/0071095 A1 | 3/2013 | Chauvier et al. |
| 2013/0086610 A1 | 4/2013 | Brockmann |
| 2013/0179787 A1 | 7/2013 | Brockmann et al. |
| 2013/0198776 A1 | 8/2013 | Brockmann |
| 2013/0254308 A1 | 9/2013 | Rose et al. |
| 2013/0272394 A1 | 10/2013 | Brockmann et al. |
| 2014/0033036 A1 | 1/2014 | Gaur et al. |

FOREIGN PATENT DOCUMENTS

| | | | |
|---|---|---|---|
| AT | 250313 T | 10/2003 | |
| AT | 472152 T | 7/2010 | |
| AT | 475266 T | 8/2010 | |
| AU | 550086 B2 | 2/1986 | |
| AU | 199060189 | 11/1990 | |
| AU | 620735 B2 | 2/1992 | |
| AU | 199184838 | 4/1992 | |
| AU | 643828 B2 | 11/1993 | |
| AU | 2004253127 A1 | 1/2005 | |
| AU | 2005278122 A1 | 3/2006 | |
| AU | 2010339376 A1 | 8/2012 | |
| AU | 2011249132 A1 | 11/2012 | |
| AU | 2011258972 A1 | 11/2012 | |
| AU | 2011315950 A1 | 5/2013 | |
| CA | 682776 A | 3/1964 | |
| CA | 2052477 | 3/1992 | |
| CA | 1302554 | 6/1992 | |
| CA | 2163500 | 5/1996 | |
| CA | 2231391 A1 | 5/1997 | |
| CA | 2273365 A1 | 6/1998 | |
| CA | 2313133 A1 | 6/1999 | |
| CA | 2313161 A1 | 6/1999 | |
| CA | 2528499 A1 | 1/2005 | |
| CA | 2569407 A1 | 3/2006 | |
| CA | 2728797 A1 | 4/2010 | |
| CA | 2787913 A1 | 7/2011 | |
| CA | 2798541 A1 | 12/2011 | |
| CA | 2814070 A1 | 4/2012 | |
| CN | 1507751 A | 6/2004 | |
| CN | 1969555 A | 5/2007 | |
| CN | 101180109 A | 5/2008 | |
| CN | 101627424 A | 1/2010 | |
| CN | 101637023 A | 1/2010 | |
| CN | 102007773 A | 4/2011 | |
| DE | 4408355 A1 | 10/1994 | |
| DE | 69516139 T2 | 12/2000 | |
| DE | 69132518 T2 | 9/2001 | |
| DE | 69333207 T2 | 7/2004 | |
| DE | 98961961 T1 | 8/2007 | |
| DE | 602008001596 | 8/2010 | |
| DE | 602006015650 | 9/2010 | |
| EP | 0093549 A2 | 11/1983 | |
| EP | 0128771 A2 | 12/1984 | |
| EP | 0419137 A2 | 3/1991 | |
| EP | 0449633 A1 | 10/1991 | |
| EP | 0 477 786 | 4/1992 | ............ H04N 7/173 |
| EP | 0523618 A2 | 1/1993 | |
| EP | 0534139 A2 | 3/1993 | |
| EP | 0568453 A1 | 11/1993 | |
| EP | 0588653 A2 | 3/1994 | |
| EP | 0594350 A1 | 4/1994 | |
| EP | 0612916 A2 | 8/1994 | |
| EP | 0624039 A2 | 11/1994 | |
| EP | 0638219 A1 | 2/1995 | |
| EP | 0643523 A1 | 3/1995 | |
| EP | 0661888 A2 | 7/1995 | |
| EP | 0714684 A1 | 6/1996 | |
| EP | 0746158 A2 | 12/1996 | |
| EP | 0761066 A1 | 3/1997 | |
| EP | 0789972 A1 | 8/1997 | |
| EP | 0830786 A1 | 3/1998 | |
| EP | 0861560 A1 | 9/1998 | |

(56) References Cited

FOREIGN PATENT DOCUMENTS

| | | | |
|---|---|---|---|
| EP | 0933966 | 8/1999 | |
| EP | 0933966 A1 | 8/1999 | |
| EP | 1026872 A1 | 8/2000 | |
| EP | 1038397 A1 | 9/2000 | |
| EP | 1038399 A1 | 9/2000 | |
| EP | 1038400 A1 | 9/2000 | |
| EP | 1038401 A1 | 9/2000 | |
| EP | 1 051 039 | 11/2000 | ............ H04N 7/24 |
| EP | 1055331 A1 | 11/2000 | |
| EP | 1120968 A1 | 8/2001 | |
| EP | 1345446 A1 | 9/2003 | |
| EP | 1422929 A2 | 5/2004 | |
| EP | 1428562 A2 | 6/2004 | |
| EP | 1521476 A1 | 4/2005 | |
| EP | 1645115 A1 | 4/2006 | |
| EP | 1725044 A2 | 11/2006 | |
| EP | 1767708 A2 | 3/2007 | |
| EP | 1771003 A1 | 4/2007 | |
| EP | 1772014 A1 | 4/2007 | |
| EP | 1887148 A2 | 2/2008 | |
| EP | 1900200 A1 | 3/2008 | |
| EP | 1902583 A1 | 3/2008 | |
| EP | 1908293 A1 | 4/2008 | |
| EP | 1911288 A2 | 4/2008 | |
| EP | 1918802 A1 | 5/2008 | |
| EP | 2100296 A1 | 9/2009 | |
| EP | 2105019 A2 | 9/2009 | |
| EP | 2106665 A2 | 10/2009 | |
| EP | 2116051 A2 | 11/2009 | |
| EP | 2124440 A1 | 11/2009 | |
| EP | 2248341 A1 | 11/2010 | |
| EP | 2269377 A2 | 1/2011 | |
| EP | 2271098 A1 | 1/2011 | |
| EP | 2304953 A2 | 4/2011 | |
| EP | 2364019 A2 | 9/2011 | |
| EP | 2384001 A1 | 11/2011 | |
| EP | 2409493 A2 | 1/2012 | |
| EP | 2477414 A2 | 7/2012 | |
| EP | 2487919 A2 | 8/2012 | |
| EP | 2520090 A2 | 11/2012 | |
| EP | 2567545 A1 | 3/2013 | |
| EP | 2577437 A1 | 4/2013 | |
| EP | 2628306 A2 | 8/2013 | |
| EP | 2632164 A2 | 8/2013 | |
| EP | 2632165 A2 | 8/2013 | |
| EP | 2695388 A2 | 2/2014 | |
| ES | 2207635 T3 | 6/2004 | |
| FR | 8211463 A | 6/1982 | |
| FR | 2 529 739 | 1/1984 | ............ H04N 7/10 |
| FR | 2891098 | 3/2007 | |
| GB | 2207838 A | 2/1989 | |
| GB | 2248955 A | 4/1992 | |
| GB | 2290204 A | 12/1995 | |
| GB | 2365649 A | 2/2002 | |
| GB | 2378345 | 2/2003 | |
| HK | 1134855 A1 | 10/2010 | |
| HK | 1116323 A1 | 12/2010 | |
| IE | 19913397 A1 | 4/1992 | |
| IL | 99586 A | 2/1998 | |
| IL | 215133 | 12/2011 | |
| IL | 222829 | 12/2012 | |
| IL | 222830 | 12/2012 | |
| IL | 225525 | 6/2013 | |
| IN | 180215 B | 1/1998 | |
| IN | 200701744 P3 | 11/2007 | |
| IN | 200900856 P3 | 5/2009 | |
| IN | 200800214 P3 | 6/2009 | |
| IS | 3759 A7 | 3/1992 | |
| JP | 63 33988 | 2/1988 | ............ H04N 7/173 |
| JP | 63-263985 A | 10/1988 | |
| JP | 2001-241993 A | 9/1989 | |
| JP | 04-373286 A | 12/1992 | |
| JP | 06-054324 A | 2/1994 | |
| JP | 7015720 A | 1/1995 | |
| JP | 7160292 A | 6/1995 | |
| JP | 8095599 A | 4/1996 | |
| JP | 8265704 A | 10/1996 | |
| JP | 10228437 A | 8/1998 | |
| JP | 10-510131 | 9/1998 | |
| JP | 11-134273 A | 5/1999 | |
| JP | H11-261966 | 9/1999 | |
| JP | 2000-152234 | 5/2000 | |
| JP | 2001-203995 A | 7/2001 | |
| JP | 2001-245271 | 9/2001 | |
| JP | 2001-514471 | 9/2001 | |
| JP | 2002-016920 | 1/2002 | |
| JP | 2002-057952 A | 2/2002 | |
| JP | 2002-112220 A | 4/2002 | |
| JP | 2002-141810 A | 5/2002 | |
| JP | 2002-208027 | 7/2002 | |
| JP | 2002-319991 | 10/2002 | |
| JP | 2003-506763 A | 2/2003 | |
| JP | 2003-087785 | 3/2003 | |
| JP | 2003-529234 | 9/2003 | |
| JP | 2004-056777 A | 2/2004 | |
| JP | 2004-110850 | 4/2004 | |
| JP | 2004-112441 | 4/2004 | |
| JP | 2004-135932 A | 5/2004 | |
| JP | 2004-264812 A | 9/2004 | |
| JP | 2004-533736 A | 11/2004 | |
| JP | 2004-536381 A | 12/2004 | |
| JP | 2004-536681 | 12/2004 | |
| JP | 2005-033741 | 2/2005 | |
| JP | 2005-084987 A | 3/2005 | |
| JP | 2005-095599 | 3/2005 | |
| JP | 2005-156996 | 6/2005 | |
| JP | 2005-519382 | 6/2005 | |
| JP | 2005-523479 A | 8/2005 | |
| JP | 2005-309752 | 11/2005 | |
| JP | 2006-067280 | 3/2006 | |
| JP | 2006-512838 | 4/2006 | |
| JP | 11-88419 | 9/2007 | ............ H04L 12/54 |
| JP | 2008-523880 | 7/2008 | |
| JP | 2008-535622 A | 9/2008 | |
| JP | 04252727 B2 | 4/2009 | |
| JP | 2009-543386 A | 12/2009 | |
| JP | 2011-108155 A | 6/2011 | |
| JP | 2012-080593 A | 4/2012 | |
| JP | 04996603 B2 | 8/2012 | |
| JP | 05121711 B2 | 1/2013 | |
| JP | 53-004612 A | 10/2013 | |
| JP | 05331008 B2 | 10/2013 | |
| JP | 05405819 B2 | 2/2014 | |
| KR | 2006067924 A | 6/2006 | |
| KR | 2007038111 A | 4/2007 | |
| KR | 20080001298 A | 1/2008 | |
| KR | 2008024189 A | 3/2008 | |
| KR | 2010111739 A | 10/2010 | |
| KR | 2010120187 A | 11/2010 | |
| KR | 2010127240 A | 12/2010 | |
| KR | 2011030640 A | 3/2011 | |
| KR | 2011129477 A | 12/2011 | |
| KR | 20120112683 A | 10/2012 | |
| KR | 2013061149 A | 6/2013 | |
| KR | 2013113925 A | 10/2013 | |
| KR | 1333200 B1 | 11/2013 | |
| KR | 2008045154 A | 11/2013 | |
| KR | 2013138263 A | 12/2013 | |
| NL | 1032594 C2 | 4/2008 | |
| NL | 1033929 C1 | 4/2008 | |
| NL | 2004670 A | 11/2011 | |
| NL | 2004780 A | 1/2012 | |
| NZ | 239969 A | 12/1994 | |
| PT | 99110 A | 12/1993 | |
| WO | WO 8202303 A1 | 7/1982 | |
| WO | WO8202303 A1 | 7/1982 | |
| WO | WO 8908967 A1 | 9/1989 | |
| WO | WO 8908967 A1 | 9/1989 | |
| WO | WO 90/13972 | 11/1990 | ............ H04N 7/167 |
| WO | WO 93/22877 | 11/1993 | ............ H04N 7/173 |
| WO | WO 9416534 A2 | 7/1994 | |
| WO | WO9416534 A2 | 7/1994 | |
| WO | WO 9419910 A1 | 9/1994 | |
| WO | WO9419910 A1 | 9/1994 | |

(56) References Cited

FOREIGN PATENT DOCUMENTS

| | | | |
|---|---|---|---|
| WO | WO9421079 A1 | 9/1994 | |
| WO | WO 9421079 A1 | 9/1994 | |
| WO | WO 95/15658 | 6/1995 | ............ H04N 7/173 |
| WO | WO9532587 A1 | 11/1995 | |
| WO | WO 9532587 A1 | 11/1995 | |
| WO | WO9533342 A1 | 12/1995 | |
| WO | WO 9533342 A1 | 12/1995 | |
| WO | WO 9614712 A1 | 5/1996 | |
| WO | WO9614712 A1 | 5/1996 | |
| WO | WO9627843 A1 | 9/1996 | |
| WO | WO 9627843 A1 | 9/1996 | |
| WO | WO 9631826 A1 | 10/1996 | |
| WO | WO9631826 A1 | 10/1996 | |
| WO | WO 9637074 A2 | 11/1996 | |
| WO | WO9637074 A2 | 11/1996 | |
| WO | WO9642168 A1 | 12/1996 | |
| WO | WO 9642168 A1 | 12/1996 | |
| WO | WO 9716925 A1 | 5/1997 | |
| WO | WO9716925 A1 | 5/1997 | |
| WO | WO 9733434 A1 | 9/1997 | |
| WO | WO9733434 A1 | 9/1997 | |
| WO | WO9739583 A1 | 10/1997 | |
| WO | WO 9739583 A1 | 10/1997 | |
| WO | WO 9826595 A1 | 6/1998 | |
| WO | WO9826595 A1 | 6/1998 | |
| WO | WO 99/00735 A1 | 1/1999 | |
| WO | WO 99/04568 | 1/1999 | |
| WO | WO 9900735 A1 | 1/1999 | |
| WO | WO9900735 A1 | 1/1999 | |
| WO | WO 9930496 A1 | 6/1999 | |
| WO | WO9930496 A1 | 6/1999 | |
| WO | WO 9930497 A1 | 6/1999 | |
| WO | WO9930497 A1 | 6/1999 | |
| WO | WO 9930500 A1 | 6/1999 | |
| WO | WO9930500 A1 | 6/1999 | |
| WO | WO9930501 A1 | 6/1999 | |
| WO | WO 9930501 A1 | 6/1999 | |
| WO | WO9935840 A1 | 7/1999 | |
| WO | WO 9935840 A1 | 7/1999 | |
| WO | WO9941911 A1 | 8/1999 | |
| WO | WO 9941911 A1 | 8/1999 | |
| WO | WO9956468 A1 | 11/1999 | |
| WO | WO 9956468 A1 | 11/1999 | |
| WO | WO 99/65243 A1 | 12/1999 | |
| WO | WO 99/65323 A1 | 12/1999 | |
| WO | WO 9966732 A1 | 12/1999 | |
| WO | WO9966732 A1 | 12/1999 | |
| WO | WO0002303 A1 | 1/2000 | |
| WO | WO 0002303 A1 | 1/2000 | |
| WO | WO 00/07372 A1 | 2/2000 | |
| WO | WO 00/08967 A1 | 2/2000 | |
| WO | WO 00/19910 A1 | 4/2000 | |
| WO | WO 0038430 A1 * | 6/2000 | |
| WO | WO 00/41397 A1 | 7/2000 | |
| WO | WO 01/39494 A1 | 5/2001 | |
| WO | WO 01/41447 A1 | 6/2001 | |
| WO | WO 01/82614 A1 | 11/2001 | |
| WO | WO 01/92973 | 12/2001 | |
| WO | WO 02/089487 A2 | 7/2002 | |
| WO | WO 02/076097 A1 | 9/2002 | |
| WO | WO 02/076099 A1 | 9/2002 | |
| WO | WO 03/026232 A1 | 3/2003 | |
| WO | WO 03/026275 A2 | 3/2003 | |
| WO | WO 03/047710 A2 | 6/2003 | |
| WO | WO 03/065683 A1 | 8/2003 | |
| WO | WO 03/071727 A2 | 8/2003 | |
| WO | WO 03091832 | 11/2003 | ............ H04L 29/06 |
| WO | WO 2004/012437 A2 | 2/2004 | |
| WO | WO 2004/018060 A2 | 3/2004 | |
| WO | WO 2004/073310 A1 | 8/2004 | |
| WO | WO 2005/002215 A1 | 1/2005 | |
| WO | WO 2005/041122 A2 | 5/2005 | |
| WO | WO 2005/053301 A2 | 6/2005 | |
| WO | WO 2005/120067 A2 | 12/2005 | |
| WO | WO 2006/014362 A1 | 2/2006 | |
| WO | WO 2006/022881 A1 | 3/2006 | |
| WO | WO 2006/053305 | 5/2006 | |
| WO | WO 2006/067697 A2 | 6/2006 | |
| WO | WO 2006/081634 A2 | 8/2006 | |
| WO | WO 2006/105480 | 10/2006 | |
| WO | WO 2006/110268 A1 | 10/2006 | |
| WO | WO 2007/001797 A1 | 1/2007 | |
| WO | WO 2007/008319 A1 | 1/2007 | |
| WO | WO 2007/008355 A2 | 1/2007 | |
| WO | WO 2007/008356 A1 | 1/2007 | |
| WO | WO 2007/008357 A1 | 1/2007 | |
| WO | WO 2007/008358 A1 | 1/2007 | |
| WO | WO 2007/018722 A2 | 2/2007 | |
| WO | WO 2007/018726 A2 | 2/2007 | |
| WO | WO 2008/044916 A2 | 4/2008 | |
| WO | WO 2008/086170 A1 | 7/2008 | |
| WO | WO 2008/088741 A2 | 7/2008 | |
| WO | WO 2008/088752 A2 | 7/2008 | |
| WO | WO 2008/088772 A2 | 7/2008 | |
| WO | WO 2008/100205 A1 | 8/2008 | |
| WO | WO 2009/038596 A1 | 3/2009 | |
| WO | WO 2009/099893 A1 | 8/2009 | |
| WO | WO 2009/099895 A1 | 8/2009 | |
| WO | WO 2009/105465 A2 | 8/2009 | |
| WO | WO 2009/110897 A1 | 9/2009 | |
| WO | WO 2009/114247 A2 | 9/2009 | |
| WO | WO 2009/155214 A2 | 12/2009 | |
| WO | WO 2010/044926 A3 | 4/2010 | |
| WO | WO 2010/054136 A2 | 5/2010 | |
| WO | WO 2010/107954 A2 | 9/2010 | |
| WO | WO 2011/014336 A1 | 9/2010 | |
| WO | WO 2011/082364 A2 | 7/2011 | |
| WO | WO 2011/139155 A1 | 11/2011 | |
| WO | WO 2011/149357 A1 | 12/2011 | |
| WO | WO 2012/051528 A2 | 4/2012 | |
| WO | WO 2012/138660 A2 | 10/2012 | |
| WO | WO 2013/106390 A1 | 7/2013 | |
| WO | WO 2013/155310 A1 | 7/2013 | |

OTHER PUBLICATIONS

Porter et al., *Compositing Digital Images*, Computer Graphics, vol. 18, No. 3, pp. 253-259, Jul. 1984.

Hoarty, "The Smart Headend—A Novel Approach to Interactive Television", Montreux Int'l TV Symposium, Jun. 9, 1995.

Ozer, *Video Compositing 101*, available from http://www.emedialive.com, Jun. 2, 2004.

International Searching Authority, International Search Report—International Application No. PCT/US/2006/022585, dated Oct. 12, 2007, together with the Written Opinion of the International Searching Authority, 13 pages.

USPTO, Office Action dated Sep. 2, 2008 pertaining to U.S. Appl. No. 11/258,602, 13 pages.

USPTO, Office Action dated Feb. 23, 2009 pertaining to U.S. Appl. No. 11/258,602, 17 pages.

ICTV, Inc., International Preliminary Report on Patentability, PCT/US2006/022585, Jan. 29, 2008, 9 pgs.

Annex C—Video buffering verifier, information technology—generic coding of moving pictures and associated audio information: video, Feb. 2000, 6 pgs.

Antonoff, Michael, "Interactive Television," Popular Science, Nov. 1992, 12 pages.

Craig, Notice of Allowance, U.S. Appl. No. 11/178,176, filed Dec. 23, 2010, 8 pgs.

Craig, Office Action, U.S. Appl. No. 11/103,838, filed Feb. 5, 2005, 30 pgs.

Craig, Final Office Action, U.S. Appl. No. 11/103,838, filed Jul. 6, 2010, 35 pgs.

Craig, Office Action, U.S. Appl. No. 11/103,838, filed May 12, 2009, 32 pgs.

Craig, Office Action, U.S. Appl. No. 11/103,838, filed Aug. 19, 2008, 17 pgs.

Craig, Office Action, U.S. Appl. No. 11/103,838, filed Nov. 19, 2009, 34 pgs.

Craig, Office Action, U.S. Appl. No. 11/178,176, filed Oct. 10, 2010, 8 pgs.

(56) References Cited

OTHER PUBLICATIONS

Craig, Office Action, U.S. Appl. No. 11/178,176, filed May 6, 2010, 7 pgs.
Craig, Office Action, U.S. Appl. No. 11/178,181, filed Feb. 11, 2011, 19 pgs.
Craig, Office Action, U.S. Appl. No. 11/178,181, filed Aug. 25, 2010, 17 pgs.
Craig, Office Action, U.S. Appl. No. 11/178,182, filed Feb. 23, 2010, 15 pgs.
Craig, Office Action, U.S. Appl. No. 11/178,183, filed Dec. 6, 2010, 12 pgs.
Craig, Office Action, U.S. Appl. No. 11/178,183, filed Feb. 19, 2010, 17 pgs.
Craig, Office Action, U.S. Appl. No. 11/178,183, filed Jul. 20, 2010, 13 pgs.
Craig, Office Action, U.S. Appl. No. 11/178,189, filed Nov. 9, 2010, 13 pgs.
Craig, Office Action, U.S. Appl. No. 11/178,189, filed Mar. 15, 2010, 11 pgs.
Craig, Office Action, U.S. Appl. No. 11/178,189, filed Jul. 23, 2009, 10 pgs.
Isovic, Timing constraints of MPEG-2 decoding for high quality video: misconceptions and realistic assumptions, Jul. 2-4, 2003, 10 pgs.
MPEG-2 Video elementary stream supplemental information, Dec. 1999, 12 pgs.
TAG Networks Inc., Office Action, CN 200680017662.3, Apr. 26, 2010, 4 pgs.
TAG Networks Inc., Office Action, EP 06739032.8, Aug. 14, 2009, 4 pgs.
TAG Networks Inc., Office Action, EP 06773714.8, May 8, 2009, 3 pgs.
TAG Networks Inc., Office Action, EP 06773714.8, Jan. 12, 2010, 4 pgs.
Talley, A general framework for continuous media transmission control, Oct. 13-16, 1997, pp. 374-383.
Tudor, MPEG-2 Video Compression, Dec. 1995, 15 pgs.
Tvhead, Inc., International Search Report, PCT/US2006/024195, Nov. 29, 2006, 9 pgs.
ActiveVideo Networks Inc., Communication Pursuant to Rules 70(2) and 70a(2), EP11833486.1, Apr. 24, 2014, 1 pg.
ActiveVideo Networks, Inc., International Search Report and Written Opinion, PCT/US2014/041430, Oct. 9, 2014, 9 pgs.
ActiveVideo Networks Inc., Examination Report No. 1, AU2011258972, Jul. 21, 2014, 3 pgs.
Active Video Networks, Notice of Reasons for Rejection, JP2012-547318, Sep. 26, 2014, 7 pgs.
Avinity Systems B. V., Final Office Action, JP-2009-530298, 0700T2014, 8 pgs.
Brockmann, Final Office Action, U.S. Appl. No. 13/686,548, filed Sep. 24, 2014, 13 pgs.
Brockmann, Final Office Action, U.S. Appl. No. 13/438,617, filed Oct. 30, 2014, 19 pgs.
Brockmann, Office Action, U.S. Appl. No. 12/443,571, filed Nov. 5, 2014, 26 pgs.
AC-3 digital audio compression standard, Extract, Dec. 20, 1995, 11 pgs.
ActiveVideo, http://www.activevideo.com/, as printed out in year 2012, 1 pg.
ActiveVideo Networks BV, International Preliminary Report on Patentability, PCT/NL2011/050308, Sep. 6, 2011, 8 pgs.
ActiveVideo Networks by, International Search Report and Written Opinion, PCT/NL2011/050308, Sep. 6, 2011, 8 pgs.
Activevideo Networks Inc., International Preliminary Report on Patentability, PCT/US2011/056355, Apr. 16, 2013, 4 pgs.
ActiveVideo Networks Inc., International Preliminary Report on Patentability. PCT/US2012/032010, Oct. 8, 2013, 4 pgs.
ActiveVideo Networks Inc., International Preliminary Report on Patentability, PCT/US2013/020769, Jul. 24, 2011, 6 pgs.
ActiveVideo Networks Inc., International Search Report and Written Opinion, PCT/US2014/030773, Jul. 25, 2014, 8 pgs.
ActiveVideo Networks Inc., International Search Report and Written Opinion, PCT/US2014/041416, Aug. 27, 2014, 8 pgs.
ActiveVideo Networks Inc., International Search Report and Written Opinion, PCT/US2011/056355, Apr. 13, 2012, 6 pgs.
ActiveVideo Networks Inc., International Search Report and Written Opinion, PCT/US20121032010, Oct. 10, 2012, 6 pgs.
ActiveVideo Networks Inc., International Search Report and Written Opinion, PCT/US2013/020769, May 9, 2013, 9 pgs.
ActiveVideo Networks Inc., International Search Report and Written Opinion, PCT/US2013/036182, Jul. 29, 2013, 12 pgs.
ActiveVideo Networks, Inc., International Search Report and Written Opinion, PCT/US2009/032457, Jul. 22, 2009, 7 pgs.
ActiveVideo Networks Inc., Extended EP Search Rpt, Application No. 09820930-4, 11 pgs.
ActiveVideo Networks Inc., Extended EP Search Rpt, Application No. 10754084-1, 11 pgs.
ActiveVideo Networks Inc., Extended EP Search Rpt, Application No. 10841764.3, 16 pgs.
ActiveVideo Networks Inc., Extended EP Search Rpt, Application No, 11833486.1, 6 pgs.
Active Video Networks Inc., Korean Intellectual Property Office, International Search Report; PCT/US2009/032457, Jul. 22, 2009, 7 pgs.
ActiveVideo Networks Inc., Extended EP Search Rpt, Application No, 13168509.1, 10 pgs.
ActiveVideo Networks Inc., Extended EP Search Rpt, Application No. 13168376-5, 8 pgs.
ActiveVideo Networks Inc., Extended EP Search Rpt, Application No. 12767642-7, 12 pgs.
ActiveVideo Networks Inc., Communication Pursuant to Rules 70(2) and 70a(2), EP10841764.3, Jun. 6, 2014, 1 pg.
ActiveVideo Networks Inc., Communication Pursuant to Article 94(3) EPC, EP08713106.6-1908, Jun. 26, 2014 5 pgs.
ActiveVideo Networks Inc., Communication Pursuant to Article 94(3) EPC, EP08713106.6-2223, May 10, 2011, 7 pgs.
ActiveVideo Networks Inc., Communication Pursuant to Article 94(3) EPC, EP09713486.0, Apr. 14, 2014, 6 pgs.
ActiveVideo Networks Inc., Examination Report No. 1, AU2011258972, Apr. 4, 2013, 5 pgs.
ActiveVideo Networks Inc., Examination Report No. 1, AU2010339376, Apr. 30, 2014, 4 pgs.
ActiveVideo Networks Inc., Examination Report, App. No. EP11749946.7, Oct. 8, 2013, 6 pgs.
ActiveVideo Networks Inc., Summons to attend oral-proceeding, Application No. EP09820936-4, Aug. 19, 2014, 4 pgs.
ActiveVideo Networks Inc., International Searching Authority, International Search Report—International application No. PCT/US2010/027724, dated Oct. 28, 2010, together with the Written Opinion of the International Searching Authority, 7 pages.
Adams, Jerry, NTZ Nachrichtentechnische Zeitschrift. vol. 40, No. 7, Jul. 1987, Berlin De pp. 534-536; Jerry Adams; 'Glasfasernetz fur Breitbanddienste in London', 5 pgs. No English Translation Found.
Avinity Systems B.V., Communication pursuant to Article 94(3) EPC, EP 07834561.8, Jan. 31, 2014, 10 pgs.
Avinity Systems B.V., Extended European Search Report, Application No. 12163713.6, 10 pgs.
Avinity Systems B.V., Extended European Search Report, Application No. 12183712-8, 10 pgs.
Avinity Systems B.V., Communication pursuant to Article 94(3) EPC, EP 07834561.8, Apr. 8, 2010, 5 pgs.
Avinity Systems B.V., International Preliminary Report on Patentability, PCT/NL2007/000245, 3 Mar. 31, 2009, 12 pgs.
Avinity Systems B.V., International Search Report and Written Opinion, PCT/NL2007/000245, Feb. 19, 2009, 18 pgs.
Avinity Systems B.V., Notice of Grounds of Rejection for Patent, JP 2009-530298, Sep. 3, 2013, 4 pgs.
Avinity Systems B.V., Notice of Grounds of Rejection fo Patent, JP 2009-530298, Sep. 25, 2012, 6 pgs.
Benjelloun, A summation algorithm for MPEG-1 coded audio signals: a first step towards audio processed domain, 2000, 9 pgs.

(56) References Cited

OTHER PUBLICATIONS

Bird et al., "Customer Access to Broadband Services," ISSLS 86—The International Symposium on Subrscriber Loops and Services Sep. 29, 1986, Tokyo, JP 6 pgs.
Broadhead, Direct manipulation of MPEG compressed digital audio, Nov. 5-9, 1995, 41 pgs.
Broclmann, Final Office Action, U.S. Appl. No. 13/668,004, filed Jul. 16, 2014, 20 pgs.
Brockmann, Office Action, U.S. Appl. No. 13/686,548, filed Mar. 10, 2014, 11 pgs.
Brockmann, Office Action, U.S. Appl. No. 13/668,004, filed Dec. 23, 2013, 9 pgs.
Brockmann, Office Action, U.S. Appl. No. 13/438,617, filed May 21, 2014, 17 pgs.
Brockmann, Final Office Action, U.S. Appl. No. 12/443,571, filed Mar. 7, 2014, 21 pgs.
Brockmann, Office Action, U.S. Appl. No. 12/443,571, filed Jun. 5, 2013, 18 pgs.
Cable Television Laboratories, Inc., "CableLabs Asset Distribution Interface Specification, Version 1.1", May 5, 2006, 33 pgs.
CD 11172-3, Coding of moving pictures and associated audio for digital storage media at up to about 1.5 MBIT, Jan. 1, 1992, 39 pgs.
Chang, Shih-Fu, et al., "Manipulation and Compositing of MC-DOT Compressed Video, " IEEE Journal on Selected Areas of Communications, Jan. 1995, vol. 13, No. 1, 11 pgs. Best Copy Available.
Craig, Notice of Allowance, U.S. Appl. No. 11/178,183, filed Jan. 12, 2012, 7 pgs.
Craig, Notice of Allowance, U.S. Appl. No. 11/178,183, filed Jul. 19, 2012, 8 pgs.
Craig, Notice of Allowance, U.S. Appl. No. 11/178,189, filed Oct. 12, 2011, 7 pgs.
Craig, Notice of Allowance, U.S. Appl. No. 11/178,176, filed Mar. 3, 2011, 8 pgs.
Craig, Notice of Allowance, U.S. Appl. No. 13/609,183, filed Aug. 13, 2013, 8 pgs.
Craig, Final Office Action, U.S. Appl. No. 11/178,181, filed Jun. 20, 2011, 21 pgs.
Craig, Final Office Action, U.S. Appl. No. 11/178,183, filed Apr. 13, 2011, 16 pgs.
Craig, Final Office Action, U.S. Appl. No. 11/178,177, filed Oct. 26, 2010, 12 pgs.
Craig, Office-Action U.S. Appl. No. 11/178,177, filed Mar. 29, 2011, 15 pgs.
Craig, Office Action, U.S. Appl. No. 11/178,177, filed Aug. 3, 2011, 26 pgs.
Craig, Final Office Action, U.S. Appl. No. 11/178,181, filed Jun. 20, 2011, 21 pgs,.
Craig, Office Action, U.S. Appl. No. 11/178,181, filed Mar. 29, 2010, 10 pgs.
Craig, Office Action, U.S. Appl. No. 11/178,183, filed Sep. 15, 2011, 12 pgs,.
Craig, Office Action, U.S. Appl. No. 11/178,189, filed May 26, 2011, 14 pgs.
Craig, Office Action, U.S. Appl. No. 13/609,183, filed May 9, 2013, 7 pgs.
Pavlovskaia, Office Action, JP 2011-516499, Feb. 14, 2014, 19 pgs.
Dahlby, Office Action, U.S. Appl. No. 12/651,203, filed Jun. 5, 2014, 18 pgs.
Dahlby, Final Office Action, U.S. Appl. No. 12/651,203, filed Feb. 4, 2013, 18 pgs.
Dahlby, Office Action, U.S. Appl. No. 12/651,203, filed Aug. 16, 2012, 18 pgs.
Digital Audio Compression Standard(AC-3, E-AC-3), Advanced Television Systems Committee, Jun. 14, 2005, 236 pgs.
Dukes, Stephen D., "Photonics for cable television system design. Migrating to regional hubs and passive networks," Communications Engineering and Design, May 1992, 4 pgs.
Ellis, et al., "INDAX: An Operation Interactive Cabletext System", IEEE Journal on Selected Areas in Communications, vol. sac-1, No. 2, Feb. 1983, pp. 285-294.
European Patent Office, Supplementary European Search Report, Application No. EP 09 70 8211, dated Jan, 5, 2011, 6 pgs.
European Patent Office, Extended European Search Report for Inte national Application No. PCT/US2010/027724, dated Jul. 24, 2012, 11 pages.
FFMPEG, hilp://www.ffmpeg.org, downloaded Apr. 8, 2010, 8 pgs.
FFMEG-0.4.9 Audio Layer 2 Tables Including Fixed Psycho Acoustic Model, 2001, 2 pgs.
Frezza, W., "The Broadband Solution—Metropolitan CATV Networks, " Proceedings of Videotex '84, Apr. 1984, 15 pgs.
Gecsei, J., "Topology of Videotex Networks," The Architecture of Videotex Systems, Chapter 6, 1983 by Prentice-Hall, Inc.
Gobl, et al., "ARIDEM—a multi-service broadband access demonstrator," Ericsson Review No. 3, 1996, 7 pgs.
Gordon, Notice of Allowance, U.S. Appl. No. 12/008,697, filed Mar. 20, 2014, 10 pgs.
Gordon, Final Office Action, U.S. Appl. No. 12/008,722, filed Mar. 30, 202, 16 pgs.
Gordon, Final Office Action, U.S. Appl. No. 12/035,236, filed Jun. 11, 2014, 14 pgs.
Gordon, Final Office Action, U.S. Appl. No. 12/035,236, filed Jul. 22, 2013, 7 pgs.
Gordon, Final Office Action, U.S. Appl. No. 12/035,236, filed Sep. 20, 2011, 8 pgs.
Gordon, Final Office Action, U.S. Appl. No. 12/035,236, filed Sep. 21, 2012, 9 pgs.
Gordon, Final Office Action, U.S. Appl. No. 12/008,697, filed Mar. 6, 2012, 48 pgs.
Gordon, Office Action, U.S. Appl. No. 12/035,236, filed Mar. 13, 2013, 9 pgs.
Gordon, Office Action, U.S. Appl. No. 12/035,236, filed Mar. 11, 2011, 8 pgs.
Gordon, Office Action, U.S. Appl. No. 12/035,236, filed Mar. 28, 2012, 8 pgs.
Gordon, Office Action, U.S. Appl. No. 12/035,236, filed Dec. 16, 2013, 11 pgs.
Gordon, Office Action, U.S. Appl. No. 12/008,697, filed Aug. 1, 2013, 43 pgs.
Gordon, Office Action, U.S. Appl. No. 12/008,697, filed Aug. 4, 2011, 39 pgs.
Gordon, Office Action, U.S. Appl. No. 12/008,722, filed Oct. 11, 2011, 16 pgs.
Henry et al. "Multidimensional Icons" ACM Transactions on Graphics, vol. 9. No. 1 Jan. 1990, 5 pgs.
Herr, Notice of Allowance, U.S. Appl. No. 11/620,593, filed May 23, 2012, 5 pgs.
Herr, Notice of Allowance, U.S. Appl. No. 12/534,016, filed Feb. 7, 2012, 5 pgs.
Herr, Notice of Allowance, U.S. Appl. No. 12/534,016, filed Sep. 28, 2011, 15 pgs.
Herr, Final Office Action, U.S. Appl. No. 11/620,593, filed Sep. 15, 2011, 104 pgs.
Herr, Office Action, U.S. Appl. No. 11/620,593, filed Apr. 19, 2010, 58 pgs.
Herr, Office Action, U.S. Appl. No. 11/620,593, filed Apr. 21, 2009 27 pgs.
Herr, Office Action, U.S. Appl. No. 11/620,593, filed Dec. 23, 2009, 58 pgs.
Herr, Office Action, U.S. Appl. No. 11/620,593, filed Jan. 24, 2011, 96 pgs.
Herr, Office Action, U.S. Appl. No. 11/620,593, filed Aug. 27, 2010, 41 pgs.
Herre, Thoughts on an SAOC Architecture, Oct. 2006, 9 pgs.
Insight advertisement, "In two years this is going to be the most watched program on TV" On touch VCR programming, published not later than 2000, 10 pgs.
lsensee et al., "Focus Highlight for World Wide Web Frames." Nov. 1, 1997, IBM Technical Disclosure Bulletin, vol. 40, No. 11, pp. 89-90.
ICTV, Inc., International Search Report/Written Opinion, PCTI/US2006/022585, Oct. 12, 2007, 15 pgs.
ICTV, Inc., International Search Report/Written Opinion, PCT/US2008/000400, Jul. 14, 2009, 10 pgs.

(56) References Cited

OTHER PUBLICATIONS

ICTV, Inc., International Search Report/Written Opinion, PCT/US2008/000419, May 15, 2009, 20 pgs.

ICTV, Inc., International Search Report/Written Opinion; PCT/US2006/022533, Nov. 20, 2006; 8 pgs.

Kato. Y., et al., "A Coding Control algorithm for Motion Picture Coding Accomplishing Optimal Assignment of Coding Distortion to Time and Space Domains," Electronics and Communications in Japan, Part 1, vol. 72, No. 9, 1989, 11 pgs.

Koenen, Rob, "MPEG-4 Overview—Overview of the MPEG-4 Standard" Internet Citation, Mar. 2001, http://mpeg.telecomitalialab.com/standards/mpeg-4/mpeg-4.htm, May 9, 2002, 74 pgs.

Konaka, M. et al., "Development of Sleeper Cabin Cold Storage Type Cooling System," SAE International, The Engineering Society for Advancing Mobility Land Sea Air and Space, SAE 2000 World Congress, Detroit, Michigan, Mar. 6-9, 2000, 7 pgs.

AcitveVideo Networks Inc., Korean Intellectual Property Office, International Search Report; PCT/US2009/032457, Jul. 22, 2009, 7 pgs.

Le Gall, Didier, "MPEG: A Video Compression Standard for Multimedia Applications", Communication of the ACM, vol. 34, No. 4, Apr. 1991, New York, NY, 13 pgs.

Langenberg, E, Integrating Entertainment and Voice on the Cable Network by Earl Langenberg 0 TeleWest International and Ed Callahan—ANTEC. work on this one.

Large, D., "Tapped Fiber vs. Fiber-Reinforced Coaxial CATV Systems", IEEE LCS Magazine, Feb. 1990, 7 pgs. Best Copy Available.

Mesiya, M.F, "A Passive Optical/Coax Hybrid Network Architecture for Delivery of CATV, Telephony and Data Services," 1993 NCTA Technical Papers, 7 pgs.

"MSDL Specification Version 1,1" International Organisation for Standardisation Organisation Internationale EE Normalisation, ISO/IEC JTC1/SC29/WG11 Coding of Moving Pictures and Autdio, N1246, MPEG96/Mar. 1996, 101 pgs.

Noguchi, Yoshihiro, et al., "MPEG Video Compositing in the Compressed Domain," IEEE International Symposium on Circuits and Systems, vol. 2, May 1, 1996, 4 pgs.

Regis, Notice of Allowance U.S. Appl. No. 13/273,893, filed May 14, 2014, 8 pgs.

Regis, Final Office Action U.S. Appl. No. 13/273,803, filed Oct. 11, 2013, 23 pgs.

Regis, Office Action U.S. Appl. No. 13/273,803, filed Mar. 27, 2013, 32 pgs.

Richardson, Ian E.G., "H.264 and MPEG-4 Video Compression, Video Coding for Next-Genertion Multimedia," Johm Wiley & Sons, US, 2903, ISBN: 0-470-84837-5, pp. 103-105, 149-152, and 164.

Rose, K., "Design of a Switched Broad-Band Communications Network for Interactive Services,"IEEE Transactions on Communications, vol. com-23, No. 1, Jan. 1975, 7 pgs.

RSS Advisory Board, "RSS 2.0 Specification", published Oct. 15, 2007.

Saadawi, Tarek N., "Distributed Switching for Data Transmission over Two-Way CATV", IEEE Journal on Selected Areas in Communications, vol. Sac-3, No. 2, Mar. 1985, 7 pgs.

SAOC use cases, draft requirements and architecture, Oct. 2006, 16 pgs.

Schrock, "Proposal for a Hub Controlled Cable Television System Using Optical Fiber," IEEE Transactions on Cable Television, vol. CATV-4, No. 2, Apr. 1979, 8 pgs.

Sigmon, Notice of Allowance, U.S. Appl. No. 13/311,293, filed Feb. 27, 2014, 14 pgs.

Sigmon, Final Office Action, U.S. Appl. No. 13/311,203, filed Sep. 13, 2013, 20 pgs.

Sigmon, Office Action, U.S. Appl. No. 13/311,203, filed May 10, 2013, 21 pgs.

Sigmon, Final Office Action, U.S. Appl. No. 11/258,602, filed Feb. 23, 2009, 15 pgs.

Sigmon, Office Action, U.S. Appl. No. 11/258,602, filed Sep. 2, 2008, 12 pgs.

Smith, Brian C., et al., "Algorithms for Manipulating Compressed Images," IEEE Computer Graphics and Applications, vol. 13, No. 5, Sep. 1, 1993, 9 pgs.

Smith. J. et al., "Transcoding Internet Content for Heterogeneous Client Devices" Circuits and Systems, 1998. ISCAS '98. Proceedings of the 1998 IEEE International Symposium on Monterey, CA, USA May 31-Jun. 3, 1998, New York, NY, USA,IEEE, US, May 31, 1998, 4 pgs.

Stoll, G. et al., "GMF4iTV: Neue Wege zur-Interaktivitaet Mit Bewegten Objekten Beim Digitalen Fernsehen," Fkt Fernseh Und Kinotechnik, Fachverlag Schiele & Schon GmbH, Berlin, DE, vol. 60, No. 4, Jan. 1, 2006. ISSN: 1430-9947, 9 pgs. No English Translation Found.

TAG Networks, Inc, Communication pursuant to Article 94(3) EPC, European Patent Application, 06773714.8, May 6, 2009, 3 pgs.

TAG Networks Inc, Decision to Grant a Patent, JP 2009-544985, Jun. 28, 2013, 1 pg.

TAG Networks Inc. IPRP, PCT/US2006/010080, Oct. 16, 2007, 6 pgs.

TAG Networks Inc., IPRP, PCT/US2006/024194, Jan. 10, 2008, 7 pgs.

TAG Networks Inc. IPRP, PCT/US2006/024195, Apr. 1, 2009, 11 pgs.

TAG Networks Inc. IPRP, PCT/US2006/024196, Jan. 10, 2008, 6 pgs.

TAG Networks Inc. International Search Report, PCT/US2008/050221, Jun. 12, 2008, 9 pgs.

TAG Networks Inc., Office Action, JP 2008-506474, Oct. 1, 2012, 5 pgs.

TAG Networks Inc. Office Action, JP 2008-506474, Aug. 8, 2011, 5 pgs.

TAG Networks Inc. Office Action, JP 2008-520254, Oct. 20, 2011, 2 pgs.

TAG Networks, Iprp, PCT/US2008/050221, Jul. 7, 2009, 6 pgs.

TAG Networks, International Search Report, PCT/US2010/041133, Oct. 19, 2010, 13 pgs.

TAG Networks, Office Action, CN 200880001325.4, Jun. 22, 2011, 4 pgs.

TAG Networks, Office Action, JP 2009-544985, Feb. 25, 2013, 3 pgs.

Tamitani et al., "An Encoder/Decoder Chip Set for the MPEG Video Standard," 1992 IEEE International Conference on Acoustics, vol. 5, Mar. 1992, San Francisco, CA, 4 pgs.

The Toolame Project, Psych_nl.c, 1999, 1 pg.

Terry, Jack, "Alternative Technologies and Delivery Systems for Broadband ISDN Access", IEEE Communications Magazine, Aug. 1992, 7 pgs.

Thompson, Jack, "DTMF-TV, The Most Economical Approach to Interactive TV," GNOSTECH Incorporated, NCF'95 Session T-38-C, 8 pgs.

Thompson, John W. Jr., "The Awakening 3.0: PCs, TSBs, or DTMF-TV—Which Telecomputer Architecture is Right for the Next Generations's Public Network?," GNOSTECH Incorporated, 1995 The National Academy of Sciences, downloaded from the Unpredictable Certainty: White Papers, http://www.nap.edu/catalog/6062.html, pp. 546-552.

Tobagi, Fouad A., "Multiaccess Protocols in Packet Communication Systems," IEEE Transactions on Communications, vol. Com-28, No. 4, Apr. 1980, 21 pgs.

Todd, AC-3: flexible perceptual coding for audio transmission and storage, Feb. 26-Mar. 1, 1994, 16 pgs.

Toms "An Integrated Network Using Fiber Optics (Info) for the Distribution of Video, Data, and Telephone in Rural Areas," IEEE Transactions on Communication, vol. Com-26, No. 7, Jul. 1978, 9 pgs.

Trott, A., et al."An Enhanced Cost Effective Line Shuffle Scrambling System with Secure Conditional Access Authorization," 1993 NCTA Technical Papers, 11 pgs.

Tvhead, Inc., First Examination Report, IN 1744/MUMNP/2007, Dec. 30, 2013, 6 pgs,.

Tvhead, Inc., International Search Report, PCT/US2006/010080, Jun. 20, 2006, 3 pgs.

Tvhead, Inc., International Search Report, PCT/US2006/024194, Dec. 15, 2006, 4 pgs.

(56) References Cited

OTHER PUBLICATIONS

Tvhead, Inc., International Search Report, PCT/US2006/024196, Dec. 11, 2006, 4 pgs.
Tvhead, Inc., International Search Report, PCT/US2006/024197, Nov. 28, 2006, 9 pgs.
Jurgen_Two-way applications for cable television systems in the '70s, IEEE Spectrum, Nov. 1971, 16 pgs.
va Beek, P., "Delay-Constrained Rate Adaptation for Robust Video Transmission over Home Networks," Image Processing, 2005, ICIP 2005, IEEE international Conference, Sep. 2005, vol. 2, No. 11, 4 pgs.
Van der Star, Jack A. M., "Video on Demand Without Compression: A Review of the Business Model, Regulations and Future Implication," Proceedings of PTC'93, 15th Annual Conference, 12 pgs.
Vernon, Dolby digital: audio coding for digital television and storage applications, Aug. 1999, 18 pgs.
Wang, A beat-pattern based error concealment scheme for music delivery with burst packet loss, Aug. 22-25, 2001, 4 pgs.
Wang, A compressed domain beat detector using MP3 audio bitstrearn, Sep. 30-Oct. 5, 2001, 9 pgs.
Wang. A multichannel audio coding algorithm for inter-channel redundancy removal, May 12-15, 2001, 6 pgs.
Wang, An excitation level based psychoacoustic model for audio compression, Oct. 30-Nov. 4, 1999, 4 pgs.
Wang, Energy compaction property of the MDCT in comparison with other transforms, Sep. 22-25, 2000, 23 pgs.
Wang, Exploiting excess masking for audio compression, Sep. 2-5, 1999, 4 pgs.
Wang, schemes for re-compressing mp3 audio bitstreams, Nov. 30-Dec. 3, 2001, 5 pgs.
Wang, Selected advances in audio compression and compressed domain processing, Aug. 2001, 68 pgs.
Wang, The impact of the relationship between MDCT and DFT on audio compression, Dec. 13-15, 2000, 92 pgs.
Welzenbach et al., "The Application of Optical Systems for Cable TV," AEG-Telefunken, Backnang Federal Rupublic of Germany, ISSLS Sep. 15-19, 1980, Proceedings IEEE Cat. No. 80 CH1565-1, 7 pgs.
Yum, TS P., "Hierarchical Distribution of Video with Dynamic Port Allocation," IEEE Transaction on Communications, vol. 39, No. 8, Aug. 1, 1991, XP000264287, 7 pgs.
ActiveVideo Networks, Inc., International Preliminary Report on Patentablity, PCT/US2013/036182, Oct. 14, 2014, 9 pgs.
ActiveVideo Networks Inc., Decision to refuse a European patent application (Art. 97(2) EPC, EP09820936.4, Feb. 20, 2015, 4 pgs.
ActiveVideo Networks Inc., Communication Pursuant to Article 94(3) EPC, 10754084.1, Feb 10, 2015, 12 pgs.
ActiveVideo Networks Inc., Communication under Rule 71(3) EPC, Intention to Grant, EP08713106.6, 19FEB2015, 12 pgs.
ActiveVideo Networks Inc., Communication Pursuant to Rule 94(3), EP08713106-6, Jun. 25, 2014, 5 pgs.
ActiveVideo Networks Inc., Communication Pursuant to Rules 161(2) & 162 EPC, EP13775121.0, Jan. 20, 2015, 3 pgs.
ActiveVideo Networks Inc., Certificate of Patent JP5675765, Jan. 9, 2015, 3 pgs.
ActiveVideo Networks Inc., Notice of Reasons for Rejection, JP2014-100460, Jan. 15, 2015, 6 pgs.
ActiveVideo Networks Inc., Notice of Reasons for Rejection, JP2013-509016, Dec. 24, 2014 (Received Jan. 14, 2015), 11 pgs.
Brockmann, Notice of Allowance, U.S. Appl. No. 13/445,104, filed Dec. 24, 2014, 14 pgs.
Brockmann, Notice of Allowance, U.S. Appl. No. 14/298,796, filed Mar. 18, 2015, 11 pgs.
Brockmann, Office Action, U.S. Appl. No. 13/737,097, filed Mar. 16, 2015, 18 pgs.
Brockmann, Office Action, U.S. Appl. No. 13/668,004, filed Feb. 26, 2015, 17 pgs.
Brockmann, Office Action, U.S. Appl. No. 13/686,548, filed Jan. 5, 2015, 12 pgs.
Brockmann, Office Action, U.S. Appl. No. 13/911,948, filed Dec. 26, 2014, 12 pgs.
Brockmann, Office Action, U.S. Appl. No. 13/911,948, filed Jan. 29, 2015, 11 pgs.
Craig, Decision on Appeal-Reversed-, U.S. Appl. No. 11/178,177, filed Feb. 24, 2015, 7 pgs.
Craig, Notice of Allowance, U.S. Appl. No. 11/178,177, filed Mar. 5, 2015, 7 pgs.
Craig, Notice of Allowance, U.S. Appl. No. 11/178,181, filed Feb. 13, 2015, 8 pgs.
Dahlby, Office Action, U.S. Appl. No. 12/651,203, filed Dec. 3, 2014, 19 pgs.
Gordon, Notice of Allowance, U.S. Appl. No. 12/008,697, filed Dec. 8, 2014, 10 pgs.
Gordon, Office Action, U.S. Appl. No. 12/008,722, filed Nov. 28, 2014, 18 pgs.
Regis, Notice of Allowance, U.S. Appl. No. 13/273,803, filed Nov. 18, 2014, 9 pgs.
Regis, Notice of Allowance, U.S. Appl. No. 13/273,803, filed Mar. 2, 2015, 8 pgs.
Tag Networks Inc, Decision to Grant a Patent, JP 2008-506474, Oct. 4, 2013, 5 pgs.
Gordon, Notice of Allowance, U.S. Appl. No. 12/008,697, filed Apr. 1, 2015, 10 pgs.

* cited by examiner

SYSTEM AND METHOD FOR PROVIDING VIDEO CONTENT ASSOCIATED WITH A SOURCE IMAGE TO A TELEVISION IN A COMMUNICATION NETWORK

CROSS-REFERENCE TO RELATED APPLICATIONS

This application is a continuation of U.S. application Ser. No. 11/258,601, filed Oct. 25, 2005, which claims the benefit of U.S. Provisional Application No. 60/702,507, filed Jul. 26, 2005. The contents of these prior applications are incorporated herein by reference in their entireties.

TECHNICAL FIELD AND BACKGROUND ART

The present invention relates to displaying video content, such as, for example internet video content, on a television in a communications network.

It is known in the prior art to display video content on a computer that is attached to the Internet as shown in FIG. 1. A user of a client computer 100 having an associated web browser 110 can request the display of a web page 120 from a server computer 130 by providing the URL (universal resource locator) for the web page 120. When the client computer 100 receives the web page 120, the web page 120 is rendered in a web browser 110. The displayed webpage 120 is a document that contains content in a format, such as HTML, along with links to other content, such as video content 150. The user of the client computer can request the display of the video content 150 by selecting the link. This selection requests the transmission of the video content from the server computer 130 through the Internet 140. The video content may be in any one of a number of different formats. For example, the content may be in Apple® Computer's Quicktime format, MPEG-2 format, or Microsoft's® Window's Media format. After the user has requested the video content 150, the video content 150 is transmitted to the client's computer 100 from the address associated with the link. Given that the video is in a particular format and is generally compressed, the video 150 must be decoded by the client computer 100. The video content 150 is decoded by a program separate from the web browser which may be a plug-in 160 to the web browser 110. The plug-in 160 is run and decodes the video content 150 and displays the video content 150 within the client's web browser. In other systems, the web browser accesses a separate program that displays the content.

In communication networks wherein the requesting device does not have the capability to separately decode video content from the web page content, the previously described client plug-in architecture will not work. An example of such a system is an interactive cable television system 200 that supports web browsing on televisions 210. The web content 230 is rendered at a remote location, such as a cable head end 240 as shown in FIG. 2. Such a cable television system 200 allows a subscriber to make a request for content using a communication device, such as a set top box 250. The request is sent to the cable headend 240 from a subscriber's set top box 250 and the head end 240 accesses the web page 230 from a server 260, renders the web page 270, encodes the web page 270 in a format that the set top box 250 can decode, and then transmits the webpage 230 to the set top box. If the web page 230 contains a link to video content 220 and the subscriber requests the display of the video content 220, the video content must be encoded in the format that the set top box can decode, such as MPEG-2 content. As such, the head end retrieves the video content associated with the requested link. The head end decodes the video content using an applicable program 280 and then re-encodes the video content 270 along with the web page in the format that the set top box can decode. Thus, each frame of video along with the substantially static webpage background is encoded. Such a process is time consuming, and resource intensive, particularly for streaming video. Additionally, because the video content needs to be decoded and re-encoded, information is lost, and therefore the displayed video has less resolution than the originally encoded video content.

SUMMARY OF THE INVENTION

In a first embodiment of the invention there is provided a system and method to provide displayed video content associated with a web page or other source image on a television in a communication network. A request at a content distribution platform in the communication network is received for display of the source image from a communication device associated with a television. In certain embodiments, the communication network is a cable television network. In other embodiments, the communication network may be a television over IP network. The content distribution platform retrieves the requested source image and displays the source image on a user's television. The user can then request video content by selecting a link on the source image. The request for video content associated with the link is then received by the content distribution platform. The content distribution platform retrieves the video content that is associated with the link if it is not already available to the platform in a pre-encoded file. The video content is pre-encoded and may be, for example, an MPEG data file. The content distribution platform then composites the video content and at least a portion of the source image together to form a video stream that can be decoded by the communication device and displayed on the television. The composited video stream is then sent through the communication network to the communication device where it is decoded and displayed on the requesting user's television. In one embodiment, at least a portion of the source image is encoded prior to compositing the web page and the video content together. The source image can be encoded in real-time using an MPEG encoder. In certain embodiments, a portion of data from the source image overlaid by the video content is discarded prior to the macro blocks of the web page being encoded.

In one embodiment, the communication device associated with the television includes a decoder capable of decoding an MPEG video stream. The communication device may be, for example, a set-top box or a cable card. In other embodiments, the communication device and the decoder are separate entities. The decoder can be a self-contained device or part of the television.

In another embodiment of the invention, prior to a request for playback of video content, the content distribution platform locates links associated with video content on a source image, such as a web page. The video content may or may not be in a format that is compatible with the decoder. The content distribution platform then downloads the video content and if the video content is not in a compatible format, the content distribution platform decodes and re-encodes the video content, so that the video content is decodable by the decoder. The video content is therefore in the process of being pre-encoded or is already pre-encoded prior to a user making a request for the video content, thus allowing the video content to be sent quicker than if the content distribution platform waited for a request to be made for the video content. The video content can also be shared amongst other users that share the same distribution platform.

The system for processing video content associated with a link includes a plurality of modules including: a receiver for receiving a request for transmission of video content associated with a link and providing the request to a retriever. The retriever retrieves the video content associated with the link. The system includes a compositor that includes an encoder that encodes at least a portion of the source image/web page into a format that the communication device can decode. The compositor then creates a composite stream based upon the encoded web page/source image and the video content that can be decoded by the communication device. A transmitter within the system transmits via a communication network the composite stream for display on a television associated with the request. In other embodiments, the receiver and transmitter are combined together as a transceiver. In still other embodiments, multiple modules may be combined together and may be comprised of hardware, software or both hardware and software.

In yet another embodiment of the system, a request for display of a web page is received by a receiver. The receiver provides the request to a retriever, wherein the receiver subsequently receives a request for display of the video content associated with a link on the web page. The retriever retrieves the web page and retrieves the video content associated with the link. In such an embodiment, the compositor creates a composite data stream based on information in the retrieved webpage and the pre-encoded video content. The transmitter then transmits the composite stream for display on a television associated with the request. The system may include a decoder associated with the television for decoding the received video content.

As already stated, the communication device may include a decoder be capable of decoding an MPEG stream and the web page and the encoded/pre-encoded video content are composited together as an MPEG video stream in certain embodiments.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Definitions: In the specification the following terms shall having the meaning given unless the context indicates otherwise. The term "frame" shall refer to both fields and frames as is understood by those in the compression arts. The term "video content" may include audio. The term "source image" shall refer to static graphical content capable of being displayed on a television, as well as dynamic graphical content. The term source image includes, but is not limited to web pages.

Figure 1:
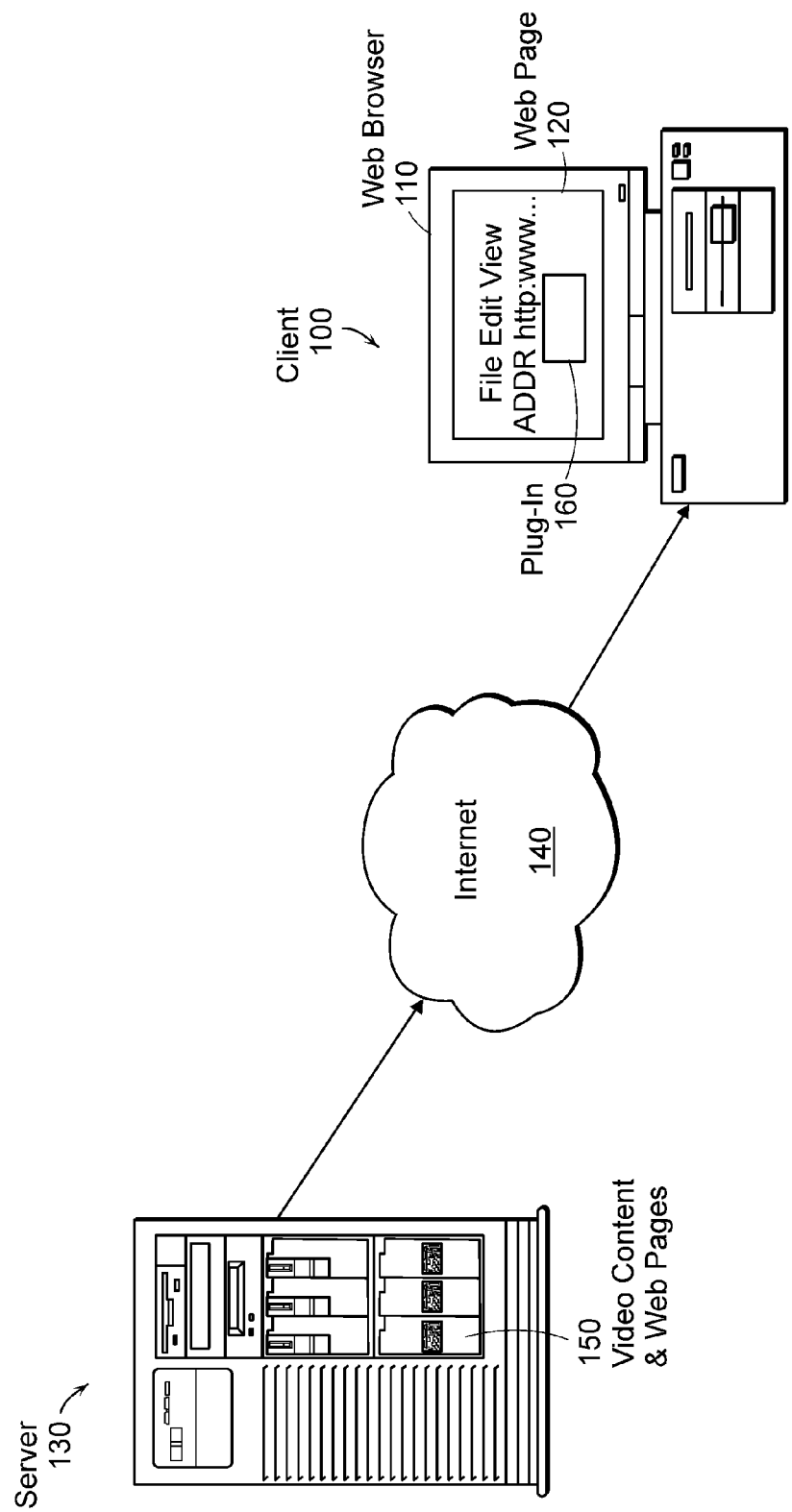
FIG. 1 is a first prior art environment for displaying video content from the Internet.
Figure 2:
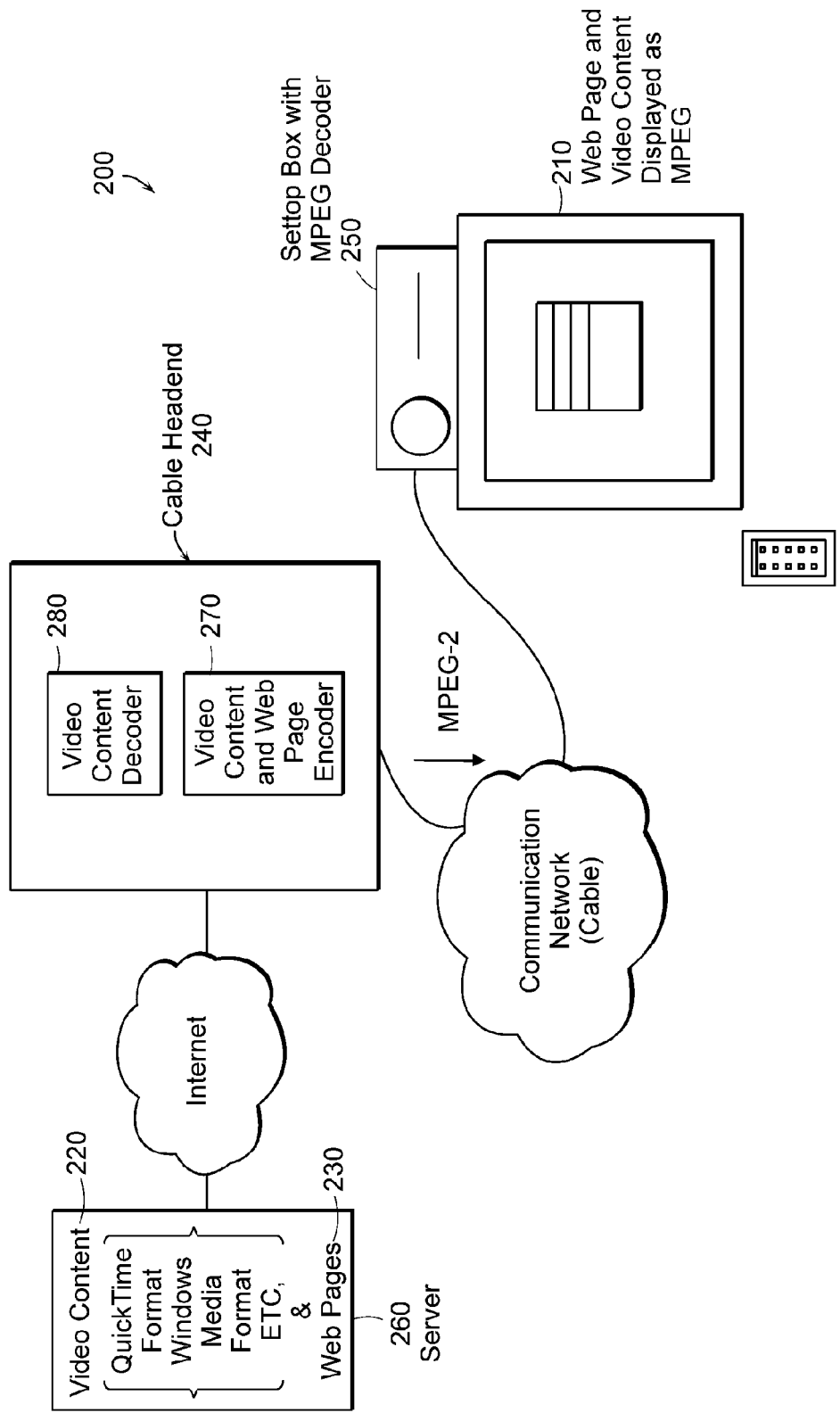
FIG. 2 is a second prior art environment for displaying video content from the Internet.
Figure 3:
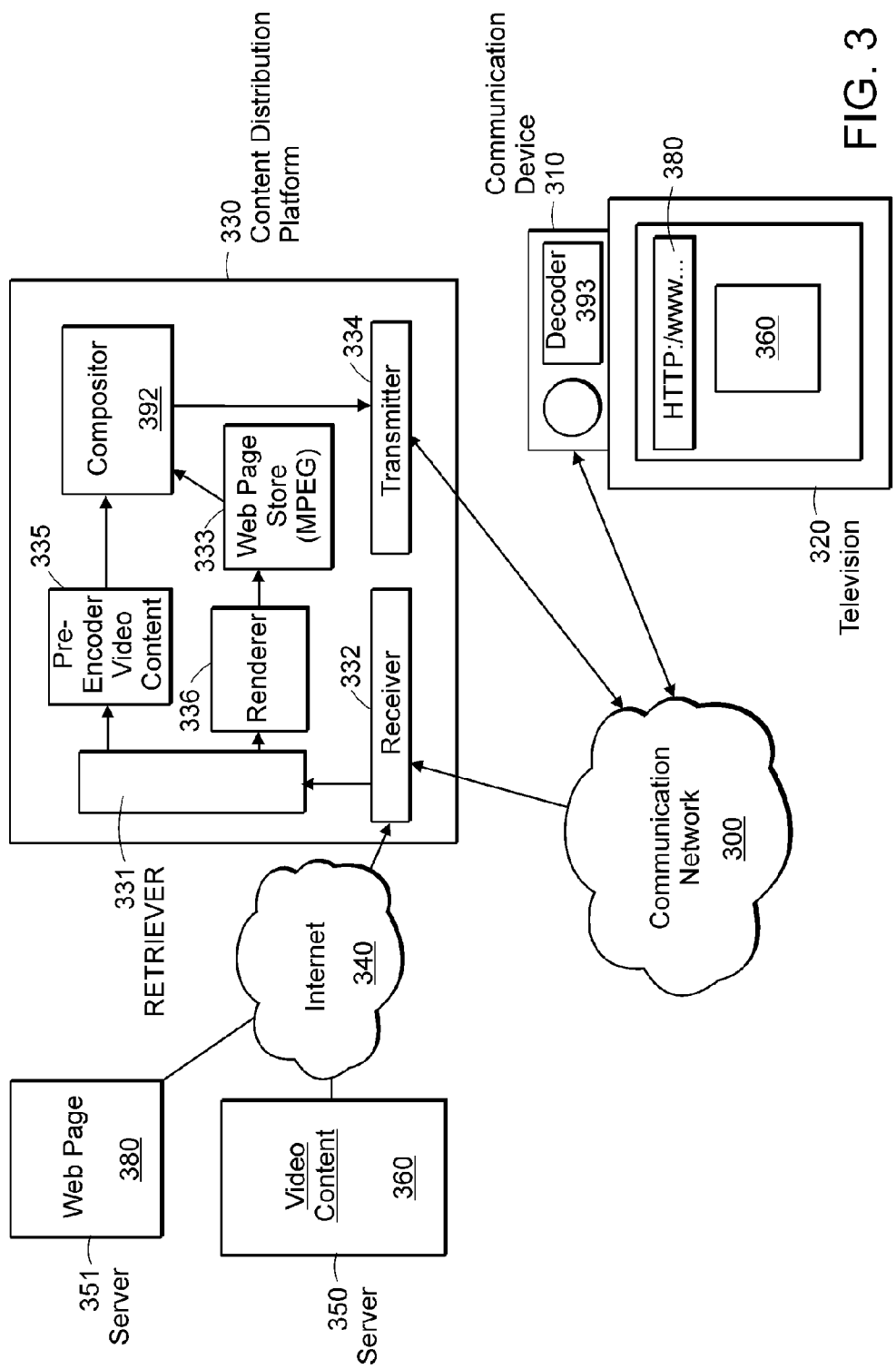
FIG. 3 is an environment showing a first embodiment of the invention.

FIG. 3. shows an environment for implementing an embodiment of the invention. The environment is designed to allow a television 320 associated with a decoder and coupled to a communication network to display video content 360 in combination with a web page or a source image. For example, a source image may be a cable television system's proprietary graphical image. The video content and source image/web page can reside in a limited-content network wherein the video content is pre-encoded in a format decodable by a decoder 393 associated with the television 320 or the video content and web page/source image may reside in an open access network wherein the video content may or may not be pre-encoded in a format that is decodable by the decoder associated with the television.

In such an environment, the television 320 is associated with a communication device 310. The communication device 310 performs limited processing tasks, such as receiving input instructions and content and formatting output instructions. The communication device, in this embodiment, includes decoder 393 for decoding video content in known formats. For example, the communication device 310 may be a set top box which is capable of receiving a digital data signal and decoding MPEG video. Examples of such set-top boxes include Motorola's DCT 200 and Amino Communications, Ltd AmiNet 110. The communication device 310 does not perform any rendering of content. All general purpose processing is performed at a content distribution platform 330, which may be at a central location, such as, a head end in a cable television network. Examples of other locations for the content distribution platforms include a central switching office for a telephone system and intermediate processing facilities, such as an ISP (Internet Service Provider). Additionally, the content distribution platform may reside at a location separate from the network's central location. Further, each module within the content distribution platform can be distributed as the modules operate as a logical network. The content distribution platform 330 includes a plurality of processors. Each processor may be associated with one or more interactive television processes. For example, the interactive processes may be the display of a movie on demand or the ability to access the internet. Thus, a user may request an interactive session from the content distribution platform using an input device by sending a predefined request signal to the content distribution platform using a subscriber input device. U.S. Pat. No. 6,100,883 (which is incorporated herein by reference in its entirety) shows such an environment wherein a content distribution platform has the foregoing features. In order to simplify explanation, embodiments of the invention will refer to web pages; however this should not be interpreted as limiting the scope of the invention to web pages and other source images may also be used.

In the embodiment that is shown in FIG. 3, the communication device 310, such as a set-top box, receives a request for an interactive session for accessing a web page from a user input device 390, such as, a remote control or a wired wireless keyboard. The request is forwarded to the content distribution platform 330 through a communication network 300. The content distribution platform 330 receives the request at a transceiver input and assigns a processor for the interactive session. The transceiver is made up of a transmitter 334 and receiver 332. The request includes at least indicia of the web page 380 and of the communication device. For example, the indicia may be the address of the web page/communication device or a code that can be located in a look-up table that is associated with the address. The web page address may be a Universal Resource Locator (URL).

The content distribution platform 330 contains a transceiver (332,334), a pre-encoder 335, storage (memory) 333, a stream compositor 392 and a retrieving module 331. All of the functions performed by these modules may be performed by a single processor or each module may be a separate processor. Further, the storage/memory 333 may be part of the processor or separate from the processor.

It should be understood that FIG. 3 shows the individual modules that are used for a single interactive session requesting video content in conjunction with a web page. As stated above, the content distribution platform can contain a plurality of processors and each processor can control multiple simultaneous interactive sessions. Therefore, the content distribution platform may contain multiple copies of the shown modules on separate processors. It should be noted that some of the modules may be shared by multiple sessions and therefore, not all modules need be part of the same processor. For example, a content distribution platform may have only a single transceiver that is shared by many processors each maintaining at least one interactive session.

As previously mentioned, the present invention as embodied may be used with open access networks, such as the internet, or with closed access networks. In closed access networks where the video content is already in a format decodable by the decoder associated with the television, the content distribution platform need not decode and re-encode the video content using a pre-encoder module. In such a closed access network, the pre-encoder module need not be part of the content distribution platform.

In an open access network, the content distribution platform parses and reviews the links on a requested web-page. If a link indicates that the video content is not in a format decodable by the decoder, the content distribution platform can pre-retrieve the video content for re-encoding. The content distribution platform can perform this check by scanning the web page code (e.g. HTML) for known video content extensions. If the link indicates video content is in the proper format, the content distribution platform can wait until receiving a request for that link before retrieving the video content.

In one example of how content distribution platform operates, the content distribution platform 330 receives a request for a web page 380. The retriever 331 forwards that request along with the return address for the content distribution platform using the transceiver (332,334) through a network, such as the internet, a LAN (local-area network) or a WAN (wide-area network) 340 to a server 350 associated with the address provided by the requesting communication device 310. The server 350 receives the request and responds to the request by sending the requested web page 380 to the transceiver (332,334) of the content distribution platform. The transceiver of the content distribution platform sends the requested web page to a renderer 336. The renderer 336 produces a rendered version of the web page placing the rendered version into a memory 333 that is accessed by an encoder that is part of the stream compositor 392. The web page may be rendered by accessing a web browser program and producing a video data output. The encoder of the stream compositor 392 encodes the renderer's output and stores the resulting web page date in memory 333. The web page is encoded as an MPEG (MPEG-2, MPEG-4) video frame and is also provided to the communication device 310 as an MPEG video stream. For example, the MPEG video frame may be repeatedly transmitted until the web page is updated by the server 350. For the remainder of this specification, it will be presumed that the communication device 310 includes a decoder 393 that can decode MPEG encoded video and that the content distribution platform encodes the content into an MPEG format. This will be done for simplification of explanation and in no way should be seen as limiting the invention to MPEG encoding schemes. Further, having the decoder within the communication device also should not be interpreted as limiting.

The retriever module 331 searches the web page for any links or other associated video content. If a link is found on the web page that is associated with video content not in a decodable format by the decoder associated with the television, the retriever 331 will make a request to the server 350 for the video content. Video content can be readily identified by the file name and associated extension (ex. mpg, avi, qt, mov etc.) When the video content 360 is received by the retriever 331, the retriever will forward the video content to the renderer 336 which provides the content to the pre-encoder 335. The pre-encoder 335 will decode the video content and re-encode the video content into a valid format for the communication device. The content is then stored to memory 333 and will only be retrieved if a user makes a request for such video content. By pre-encoding the video content prior to receiving a request for the video content, the video content will be either encoded or already in process of being encoded when requested, allowing the video content to be transmitted more rapidly than if the content is retrieved when a request is received. Further, once the video content is pre-encoded, the video content can be stored in memory and saved for later retrieval by another user of the system or for another session by the same user. The pre-encoder may also serve to perform off-line pre-encoding of known content. For example, if a user selects a website, the pre-encoder may access and begin pre-encoding all content from web pages associated with the website that is not in a format decodable by decoders within the network. Thus, in a cable television network in which a plurality of subscribers share the same content distribution platform, the video content is accessible and pre-encoded for all subscribers. Thus, the pre-encoded content can improve the time between a request being made and the display of video content on the television of the requesting subscriber.

If the content distribution platform is configured to allow sharing of pre-encoded content among multiple users of the network, the pre-encoded content can be stored in a repository. The repository may be located either locally or remotely from the content distribution platform. In such an embodiment, the content distribution platform includes a management module. The management module maintains the repository and contains a database of information regarding the pre-encoded content. The management module maintains a data structure that indicates the file name and the storage location within memory of the repository. For each pre-encoded content file, the database may include parameters indicating: whether the content is time sensitive, the time that the content was retrieved, the location from where the content was retrieved, the recording format of the content, a user identifier regarding the last person to request the content, a counter identifying the number of times the content is accessed. Additionally, the database can include other parameters.

Each time a user requests content, the management module searches the repository to determine if the repository contains the requested content. If the content is stored in the repository, the management module determines if the content is time sensitive content by accessing the database. If a parameter in the database indicates that the content is time sensitive, the management module requests information from the server providing the content to determine if the repository contains the most recent version of the content. For example, the management module may obtain a version number for the content or a timestamp of when the content was created/posted. The management module compares this information to the data in the database. If the repository contains the most recent version of the content, the management module directs the pre-encoded version of the content to the television of the requesting user. If the repository does not contain the most recent version of the content, the management module requests the content from the server. The management module causes the content distribution platform to transcodes the requested content into a format that the decoder associated with the requesting television can decode. The content distribution platform then distributes the encoded content to the device associated with the requesting television.

In certain embodiments, the management module includes an algorithm for determining how long to maintain a pre-encoded file. The management module may have a fixed period for maintaining the content, for example 24 hours. Any pre-encoded content file that includes a timestamp that falls outside of the previous 24 hour period is purged from the repository. In other embodiments, the management module maintains content based upon popularity (i.e. the number of times a file is accessed within a given time period). For example, the algorithm may maintain the top 1000 content files wherein a database keeps a counter for each file that a user accesses. The management module may maintain content using a combination of time and popularity, where the management module uses a weighting factor based upon popularity. For example, each file may be maintained for a set time period of 6 hours, but if the file is within the top 100 accessed files, the file will be maintained for an additional 6 hours. By regularly purging the repository, the repository memory can be efficiently used.

In certain embodiments, the pre-encoded content can be maintained locally to a group of end users or to a single user. For example, the system maintains pre-encoded content for users within a 10 block radius. Thus, the management module is also situated locally with the pre-encoded content. Therefore, different localities may have different pre-encoded content. This would be preferable for city-wide or national systems, where local content (news, sports, weather) would be more likely to be pre-encoded and stored for the local users of the system.

If the network is a closed network, the retriever does not need to parse through the links nor does the video content need to be pre-encoded, since all of the video content is already in a format that is decodable by the decoder at the requesting television.

A subscriber then makes a request for video content 360 associated with a link on the requested web page 380 by using the user input device 390 to select the link. The requested web page 380 and the requested video content 360 although associated, may reside on different servers 350, 351. The link information is passed through the communication network 300 to the content distribution platform 330 and the content distribution platform 330 requests the video content or retrieves the video content from memory depending on whether the video content needed to be pre-encoded.

An example of such a communication network for selecting a link of a web page that is displayed on a television is taught in U.S. patent application Ser. No. 10/895,776 entitled "Television Signal Transmission of Interlinked Data and Navigation Information for use By a Chaser Program" that is assigned to the same assignee and is incorporated herein by reference in its entirety. Reference to this application should not be viewed as limiting the invention to this particular communication network.

The compositor 392 retrieves the stored web page data and the video content which is encoded as MPEG data. The web page and the video content are then composited together. The web page is saved as a series of macro blocks which are a subset of pixels (ex. 16×16) which together comprise an entire frame of video. Each macro block of the web page is separately processed. The display position (macro block position) of the video content may be predetermined or determined during compositing by compositor 392. Macro blocks within the web page that are to be overlaid by the video content are not processed. The macro blocks of the video content are then inserted in place of the macro blocks of the web page that are not processed. In order to provide continuity, the video content may need to be padded with pixels if the video content is not defined in perfect macro block increments. In addition to the top left corner of the video content window being aligned to a macro block boundary, the right and bottom corner must also be aligned (the height and width must be divisible by 16). For example, if the video content is 100×100 pixels in size and each macro block is 16 pixels by 16 pixels square, it would take 7×7 macroblocks (112 pixels by 112 pixels) to present the video content and therefore, there would be a border around the video content that is 12 pixels wide. The content distribution platform would insert this border and the border could be made any desired color. For example, the content distribution platform may make the border pixels black. This process is performed for all video content to be displayed.

Each composited frame is then transmitted by the transceiver (332,334) through the communication network 300 to the communication device. The communication device 310 can then use decoder 393 to decode the MPEG video stream and provide the output to the television set. The video content 360 will then be displayed on the television 320. Thus, it appears to a viewer of the television that the web page is rendered locally with the video content, even though the rendering occurs on the content distribution platform. It should be understood that the communication device may include a digital to analog converter for converting the MPEG video stream to an analog signal for display on an analog television or for providing the MPEG video stream to a component, composite or other analog input on a digital television.

Figure 4:
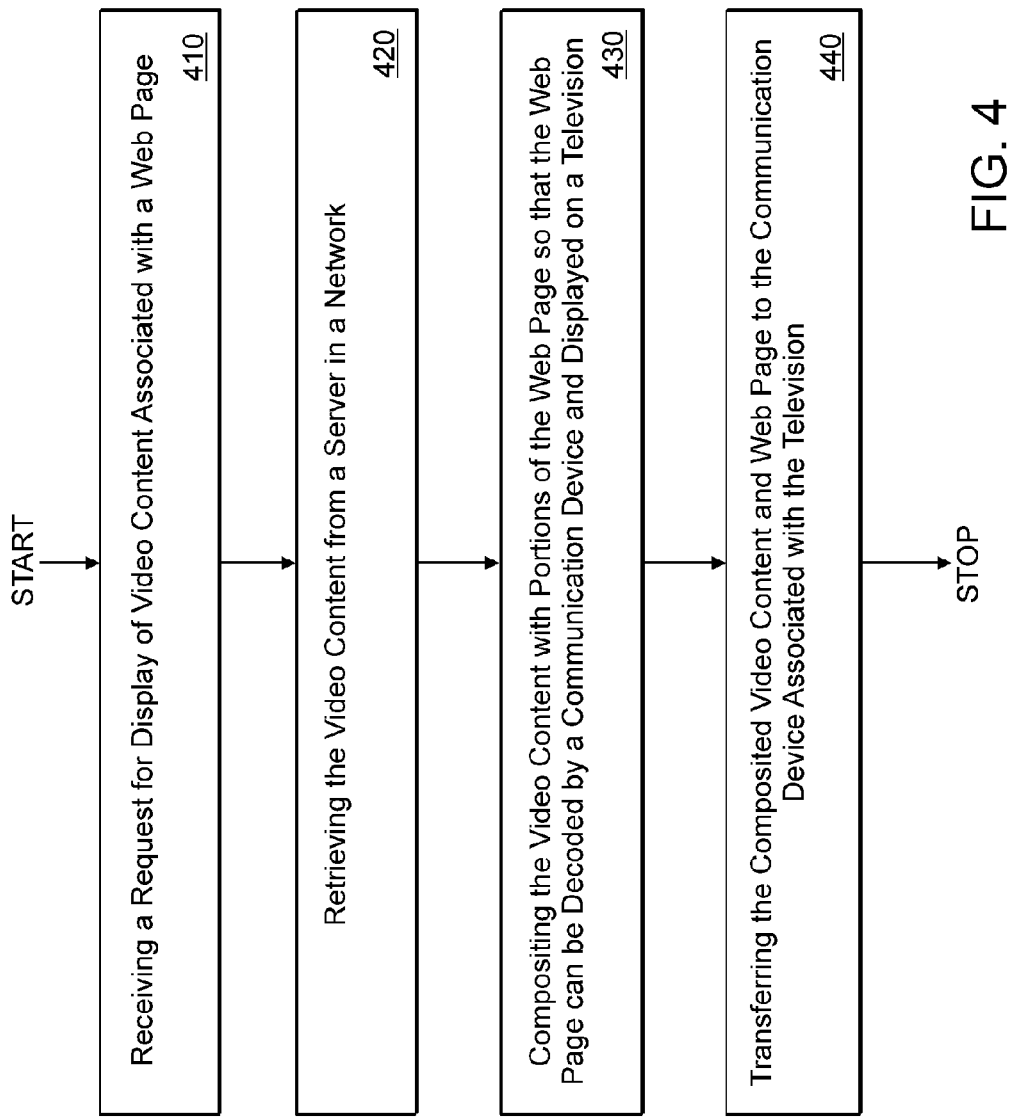
FIG. 4 is a flow chart of one embodiment of the invention for accelerating delivery of video content to a television in a communication network.

FIG. 4 is a flow chart showing the methodology employed at the content distribution platform when a user selects a link on a web page for display of video content. The content distribution platform receives a request for display of video content associated with a link on the displayed web page (410). The request is sent from the communication device and includes a representation of the web address for the video content. For example, the set-top box/communication device may transmit a signal that represents a direction/relative location on the display. In one embodiment, the platform contains a predetermined map for associating a user's input with a link. In another an embodiment, the position of each link on the web page is mapped upon receiving the web page and the content distribution platform creates a look-up table that associates the directional command with a link. Based upon this received directional signal, the content distribution platform can relate the direction/relative location signal to the desired link from the web page. Further explanation regarding embodiments of mapping links with directional commands is disclosed in U.S. patent application Ser. No. 09/997, 608 entitled, "System and Method for Hyperlink Navigation Between Frames" that is assigned to the same assignee and is incorporated herein by reference in its entirety.

The content distribution platform then retrieves the video content (420). If the video content is already in a format that is decodable by the decoder associated with the requesting television, the content distribution directs the request with the address of the link to the server through the Internet to retrieve the video content. The server receives the request for the video content and forwards the video content to the content distribution platform. The content distribution platform, which has maintained an active interactive session with the communication device requesting the video content, receives the video content and associates the video content with the interactive session. The video content is preferably an MPEG stream. Additionally, the content distribution platform may receive periodic updates of the Web Page data (RGB data received into a video buffer which is converted into YUV image data). If the video content was not in a format that is decodable by the decoder and was previously retrieved and pre-encoded, the content distribution platform retrieves the pre-encoded video content from memory.

The content distribution platform then composites the pre-encoded video content and the web page together 430. The compositor creates an MPEG video stream from the web page data and the MPEG video content. For each frame of the MPEG video stream transmitted to the decoder, the compositor encodes each macro block of the web page data in real-time and inserts the pre-encoded video content into the encoded web page macro block data.

The compositor divides the data (YUV data) of the web page into macro blocks and determines the position for display of the video content within the web page. The position relates to the macro block locations for the video content when displayed on a display device. For each frame of the MPEG stream, the compositor parses the video content into frames and determines the frame-type of the video content frame. After the frame-type is determined, the macro blocks of the web page are encoded in real-time based upon the type of frame. The macro blocks of the web page data that overlap with the video content are not encoded and are discarded. The compositor splices the encoded video content macro blocks in with the encoded web page macro blocks at the pre-determined position. This compositing step continues for each frame of video content.

The web page data is repeatedly used in the compositing process; however all of the information need not be transmitted, since much of each web page is temporally static. The same encoded web page data can be reused, until the web page changes. As explained below, the web page macro block data is encoded in real-time and the manner in which it is encoded (as an interframe or intra frame block etc.) is determined based upon the type of frame of the video content that is being composited with the encoded web page.

Since the content distribution platform maintains an internet session with the server from which the web page was received, the content distribution platform may receive updated content for a web page. When such an update is received, the content distribution platform replaces the old web page with the content of the new web page. The compositor encodes the new web page content, discards macro blocks that overlap with the video content, and splices the video content with the new encoded web page content as explained above with respect to 430 and below in FIG. 5.

As each frame is composited, the frame is transmitted into the communication network to the address associated with the communication device (440). The communication device then decodes the composited MPEG video stream and displays the stream on the television set. To the subscriber, the image on the television set appears as if the television is rendering the web page and video content in a web browser, when in actuality, the images on the television are merely decoded MPEG video frames.

Figure 5:
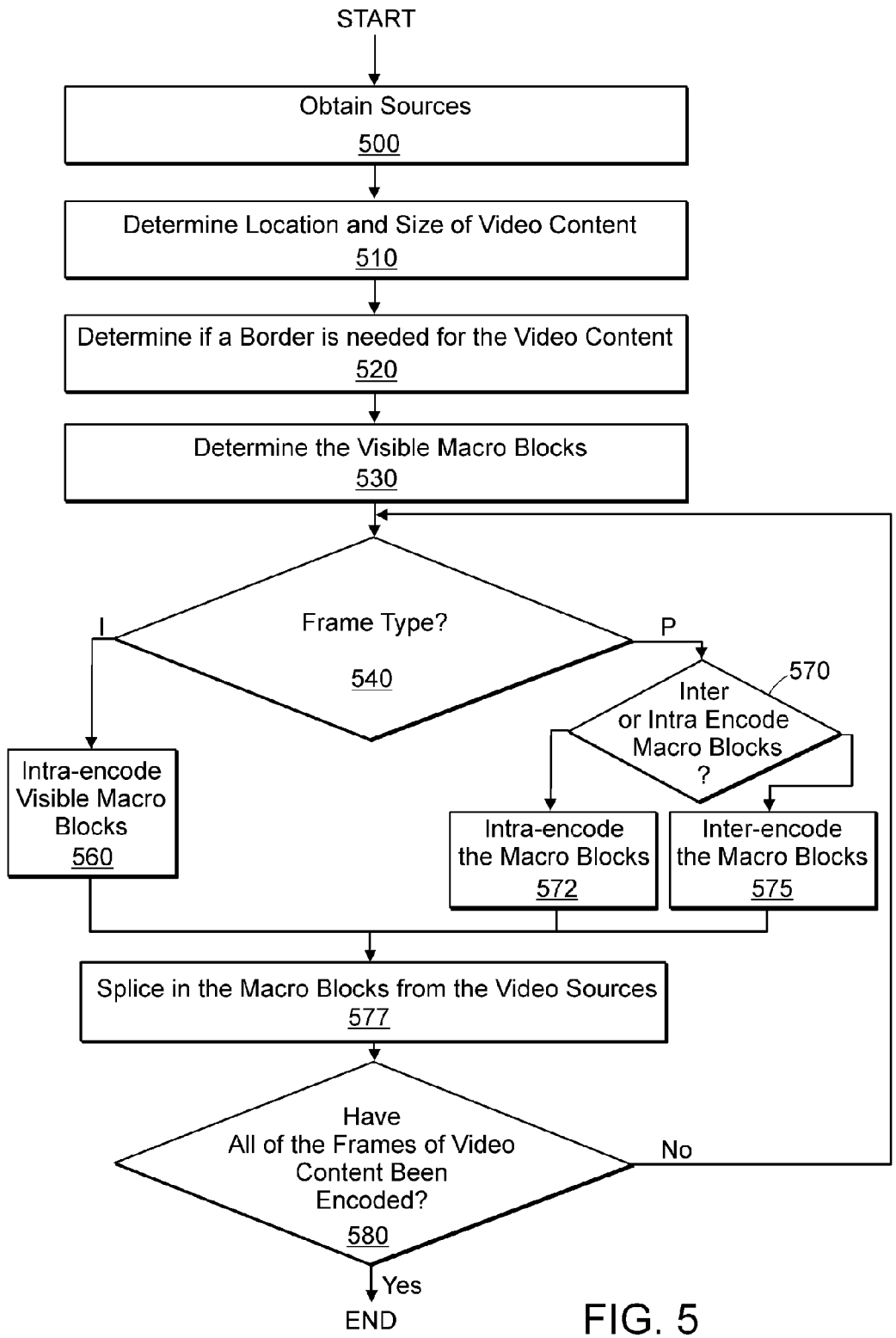
FIG. 5 is a flow chart that further explains the methodology of compositing video source material and background material.

FIG. 5 is a flow chart that elaborates on the compositing process performed by the compositor. First, the sources to be displayed are determined and are obtained (500). A request for content is issued by a user. For example, a user requests the display of a pre-encoded video source by selecting a link on a web page. Thus, there are at least two sources of information: a background image, the web page, and a foreground image, the video content. It should be recognized that the background, the web page, is not encoded when received by the compositor, whereas foreground, the video content is received as pre-encoded data. Further, there may be more than one video source. The additional video sources may be part of the web page. An example of a web page that contains two video sources is presented in FIG. 6 wherein the video sources are labeled X and Y.

The location and size of the video content with respect to the background is next determined by the content distribution platform (510). The location may be predefined with respect to the background, for example the video content associated with the link may be centered at the center of the background. Similarly, the size of the video content may be preset. The content distribution platform may allow the video content to be shown at its native resolution. In other embodiments, the size of the video content may be limited to a number of macro blocks (e.g. 10×10, 15×15 etc.). In such embodiments, the compositor scales the video content as is known to those in the art. Once the location and size are fixed, the compositor determines whether any border region is necessary, so that the video source material lies on a macro block boundary of the background 520.

Figure 6:
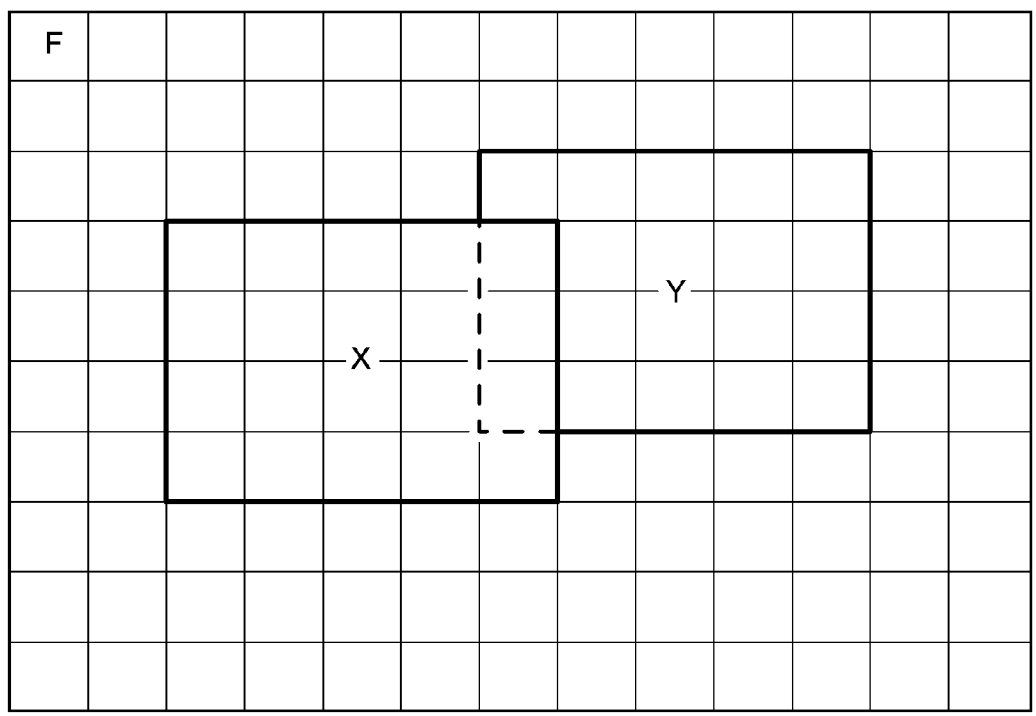
FIG. 6 is an image that shows a frame of video content in which there is a background image and two video sources X and Y.

Next, the visible macro blocks are determined 530. A visible macro block is a macro block that is not obscured by another macro block that overlays it. The selected pre-encoded video content overlays a portion of the web page and therefore, obscures a section of the web page. As shown in FIG. 6, frame F is broken up into a plurality of macro blocks. Macro blocks from the two video content sources X and Y overlap with each other and also overlap with the frame background F. Video content source X lies on top of some of the macro blocks of video source Y, and both X and Y lie on top of the frame background. As a result, not all of video source Y is displayed. Similarly, not all of the macroblocks of the frame background are displayed. The content distribution platform determines the top most macro block for each macroblock in the frame.

The compositor then begins to encode each frame of the MPEG stream. First the overall frame type is determined. The compositor inquires whether the frame should be an I or a P MPEG frame 540. Frame type is selected based upon the frame type of the video content that is being composited with the background. If the frame type of the current frame of any of the video sources content is a P type frame, then the overall frame type will be a P frame. If the frame type of the video content source(s) is an I frame, then the overall frame type will be an I frame. Referencing FIG. 6, if the current video frame for video source X is an I frame, and the current video frame for video source Y is a P frame, then the overall frame type will be a P frame. If the frame type of all of the video content that is to be composited is I type (ex. X and Y are I frames), then the overall frame type is an I frame. Once the overall frame type is determined, the MPEG frame headers are written.

Next the macroblocks are each systematically and individually processed. The compositor inquires if the current macroblock being processed is already pre-encoded, and therefore, part of the video content (550). If the answer is no, the macro block contains data from the web page. If the compositor has determined that the overall frame type is a P type frame, the encoder decides whether to encode the web page macro block as an intercoded macroblock or as an intracoded macro block (570). The encoder will generally encode the macro block as an intercoded macroblock (575), but if there are changes above a threshold in the data content of the macroblock as compared to the macro block at the same location from the previously encoded frame, the encoder will encode the macro block as an intracoded macro block (572). If the overall frame type is an I type frame, the web page macro block is intracoded (560). Thus, only the background/non-video content material is real-time encoded. If the macro-block does contain pre-encoded data (video content), the video content macro block is spliced into the macro block sequence regardless of the overall frame type (577). The encoding methodology is repeated for each macroblock until the frame is complete (578). Once a frame is completely encoded, the content distribution platform inquires whether each of the frames of video content within the video sequence have been encoded (580). If all of the video content has been encoded or the communication device sends a stop command to the content distribution platform, the sequence ends and compositing stops. If all of the frames have not been processed, then the process returns to block 540.

As the background and the video content are composited together frame by frame and constructed into an MPEG data stream, the encoded MPEG stream is sent to the communication device through the communication network and is decoded by the decoder and displayed on the subscriber's television.

In the previous example, it was assumed that the background was a web page from the internet. The background need not be a web page and may come from other sources. For example, the background may be a cable operator's background image and not a web page, wherein video content is composited with the cable operator's background.

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

What is claimed is:

1. A method of processing encoded video content that includes a plurality of encoded video frames, the encoded video content being addressed by a link on a static source image, for display of the encoded video content and the static source image on a television, the television coupled to a communication network through a communication device, the method comprising:
   retrieving the encoded video content addressed by the link; and
   in response to receiving a request for display of the encoded video content on the television, at a server, forming a sequence of composite video frames in a format decodable by the communication device, each composite video frame being formed by compositing an encoded frame of the encoded video content with at least one portion of the static source image, wherein the compositing includes selecting a frame type, from a plurality of frame types, of the encoded video content based on the frame type of the encoded video frame and encoding the at least one portion of the static source image according to the selected frame type.

2. The method according to claim 1, wherein a portion of the static source image is removed, and compositing includes, when forming each composite video frame, inserting the encoded video content at a location of the static source image where the removed portion was located.

3. The method according to claim 1, further comprising:
   transmitting the sequence of composite video frames through the communication network to the communication device that transmitted the request.

4. The method according to claim 1, wherein at least a portion of the static source image is encoded as an MPEG frame prior to compositing and after receiving the request for display of the encoded video content.

5. The method according to claim 1, wherein retrieving the encoded video content comprises:
   searching a repository for a stored version of the encoded video content;
   if the stored version of the encoded video content is in the repository, determining whether the encoded video content is time-sensitive; and
   if the encoded video content is time-sensitive, determining whether the stored version of the encoded video content is the most recent version of the encoded video content.

6. The method according to claim 5, wherein determining whether the stored version of the encoded video content is the most recent version of the encoded video content includes comparing a timestamp associated with the stored version of the encoded video content to a timestamp of the encoded video content associated with the link.

7. The method according to claim 5, wherein retrieving the encoded video content includes, if the stored version of the encoded video content is the most recent version of the encoded video content, retrieving the stored version of the encoded video content from the repository.

8. The method according to claim 5, wherein retrieving the encoded video content includes, if the stored version of the encoded video content is not the most recent version of the encoded video content, requesting the encoded video content from a source associated with the link.

9. The method according to claim 5, wherein the repository is located remotely from the content distribution platform.

10. The method according to claim 1, further comprising:
    determining a group of end users associated with the encoded video content, each user in the group of end users having a communication device associated with a television.

11. The method according to claim 10, wherein the group of end users consists of a single user.

12. The method according to claim 10, wherein the group of end users is defined using a national boundary, a city boundary, or a circle having a given center and radius.

13. The method according to claim 1, wherein the selected frame type of each encoded video frame is an I-frame or a P-frame.

14. The method according to claim 13, further comprising:
    retrieving additional encoded video content, the additional encoded video content including a plurality of additional encoded video frames, wherein the additional encoded video content is to be displayed with the encoded video content and the static source image on the television; and selecting the frame type of the composite video frame to be an I-frame if the frame type of the encoded frame and a frame type of a respective frame of the additional encoded video frames are both I-frames.

15. The method according to claim 13, further comprising: retrieving additional encoded video content, the additional encoded video content including a plurality of additional encoded video frames, wherein the additional encoded video content is to be displayed with the encoded video content and the static source image on the television; and selecting the frame type of the composite video frame to be a P-frame if the frame type of either of the encoded video frame and a respective frame of the additional encoded video frames is a P-frame.

16. The method according to claim 1, wherein selecting the frame type includes selecting based on the encoding type of one or more macroblocks of the encoded video frame.

17. A system for providing, to a decoder associated with a television, encoded video content that includes a plurality of video frames, the encoded video content being addressed by a link on a static source image, the system comprising:
 a receiver for receiving, from the decoder, a request for display of at least the encoded video content on the television;
 a retriever for retrieving the encoded video content addressed by the link on the static source image; and
 a server, comprising:
  a compositor for creating a sequence of composite video frames in response to the receiver receiving the request for display of the encoded video content, wherein for each composite video frame, the compositor selects a frame type for the composite video frame, from a plurality of frame types, of the encoded video content based on the frame type of an encoded frame of the encoded video content, and combines at least a portion of the static source image with the encoded frame of encoded video content, the static source image being encoded according to the selected frame type.

18. The system according to claim 17, further comprising an encoder enabled to encode the static source image with a portion of the static source image removed, wherein the compositor creates a series of video frames that includes the encoded video content inserted into the removed portion of the encoded static source image.

19. The system according to claim 18, wherein the encoder is enabled to decode previously encoded video content into decoded video content.

20. The system according to claim 19, wherein the encoder is enabled to encode the decoded video content into the encoded video content.

21. The system according to claim 20, wherein the encoder is enabled to encode the decoded video content as a series of MPEG frames.

22. The system according to claim 17, wherein the selected frame type of each encoded video frame is an I-frame or a P-frame.

23. The system according to claim 22, wherein the retriever is further enabled to retrieve additional encoded video content, the additional encoded video content including a plurality of additional encoded video frames, and wherein the compositor is further enabled to select the frame type of the composite video frame to be an I-frame if the frame type of the encoded frame and a frame type of a respective frame of the additional encoded video frames are both I-frames.

24. The system according to claim 22, wherein the retriever is further enabled to retrieve additional encoded video content, the additional encoded video content including a plurality of additional encoded video frames, and wherein the compositor is further enabled to select the frame type of the composite video frame to be a P-frame if the frame type of either the encoded video frame or a respective frame of the additional encoded video frames is a P-frame.

25. The system according to claim 17, wherein selecting the frame type includes selecting based on the encoding type of one or more macroblocks of the encoded video frame.

* * * * *